(12) United States Patent
Shimokawa

(10) Patent No.: US 10,541,570 B2
(45) Date of Patent: Jan. 21, 2020

(54) POWER SOURCE, WIRELESS POWER TRANSFER SYSTEM, AND POSITIONAL INFORMATION CALCULATION METHOD OF POWER RECEIVER

(71) Applicant: FUJITSU LIMITED, Kawasaki-shi, Kanagawa (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/678,569

(22) Filed: Aug. 16, 2017

(65) Prior Publication Data

US 2017/0346349 A1 Nov. 30, 2017

Related U.S. Application Data

(63) Continuation of application No. PCT/JP2015/055274, filed on Feb. 24, 2015.

(51) Int. Cl.
*H02J 7/02* (2016.01)
*H02J 50/90* (2016.01)
*H02J 50/12* (2016.01)

(52) U.S. Cl.
CPC ............... *H02J 50/90* (2016.02); *H02J 7/025* (2013.01); *H02J 50/12* (2016.02)

(58) Field of Classification Search
CPC .. H02J 50/90; H02J 50/80; H02J 50/12; H02J 7/025; H04B 5/0037
USPC ...................................................... 307/104
See application file for complete search history.

(56) References Cited

U.S. PATENT DOCUMENTS

| | | | | |
|---|---|---|---|---|
| 9,948,135 | B2 * | 4/2018 | Leabman | H02J 7/042 |
| 10,128,697 | B1 * | 11/2018 | Anwer | H04B 5/0043 |
| 10,153,645 | B1 * | 12/2018 | Bell | H02J 5/005 |
| 10,224,758 | B2 * | 3/2019 | Leabman | H02J 5/005 |
| 2011/0309688 | A1 | 12/2011 | Yamazaki | |
| 2011/0316476 | A1 | 12/2011 | Washiro | |
| 2015/0001936 | A1 | 1/2015 | Eguchi | |

FOREIGN PATENT DOCUMENTS

| | | |
|---|---|---|
| JP | 2012-10524 A | 1/2012 |
| JP | 2012-023950 A1 | 2/2012 |
| JP | 2013-043046 A1 | 3/2013 |

(Continued)

OTHER PUBLICATIONS

A. Kurs, et al., "Wireless Power Transfer via Strongly Coupled Magnetic Resonances," Science; vol. 317; Jul. 6, 2007; pp. 83-86, (4 Sheets total); (science_vol. 317)./p. 4 of specification.

(Continued)

*Primary Examiner* — Dinh T Le
(74) *Attorney, Agent, or Firm* — Kratz, Quintos & Hanson, LLP

(57) ABSTRACT

A power source includes a power source coil, a power transfer control unit, and a power receiver detection unit. The power source coil is configured to wirelessly transfer power to a power receiver using one of magnetic field resonance and electric field resonance, and the power transfer control unit is configured to control the power source coil. Further, the power receiver detection unit is configured to detect the power receiver by bringing the power receiver into proximity thereto or contact therewith.

18 Claims, 24 Drawing Sheets

(56) References Cited

FOREIGN PATENT DOCUMENTS

| | | |
|---|---|---|
| JP | 2013-247718 A1 | 12/2013 |
| JP | 2015-008620 A1 | 1/2015 |

OTHER PUBLICATIONS

"System Description Wireless Power Transfer;" Wireless Power Consortium, vol. I: Low Power, Part 1: Interface Definition, Version 1.1.2, Jun. 2013; (186 Sheets total) (wireless_power_specification_part1)./p. 4 of specification.

R. Tseng, et al.; "Introduction to the Alliance for Wireless Power Loosely-Coupled Wireless Power Transfer System Specification Version 1.0;" (Reprinted from) IEEE Wireless Power Transfer Conference 2013, Technologies, Systems and Applications; May 15-16, 2013; pp. 1-6 (6 Sheets total), (IEEE_IMS2013_WPC_A4WP_Specification_Introduction_(Keynote_Paper))./p. 4 of specification.

J. Nadakuduti, et al.; "Operating Frequency Selection for Loosely Coupled Wireless Power Transfer Systems with Respect to RF Emissions and RF Exposure Requirements;" (Reprinted from) IEEE Wireless Power Transfer conference 2013, Technologies, Systems and Applications; May 15-16, 2013; pp. 1-6 (6 Sheets total); (IEEE_IMS_WPT_Conference_2013_WPT_Operating_Frequency_Regulatory_Considerations)./p. 4 of specification.

"A4WP Wireless Power Transfer System Baseline System Specification (BSS);" TWC of A4WP, Ver. 1.2; Nov. 21, 2013; (96 Sheets total) (a4wp2013.221.01_BSS_v1.2)./pp. 4-5 of specification.

International Search Report for International Application No. PCT/JP2015/055274 dated Apr. 28, 2015 2 pages, 1 page translation, 3 pages total).

Written Opinion of the International Searching Authority for International Application No. PCT/JP2015/055274 dated Apr. 28, 2015 (5 pages, 3 pages translation, 8 pages total).

Japanese Office Action for corresponding Japanese Patent Application No. 2017-501610 dated Apr. 19, 2018 (6 Sheets).

\* cited by examiner

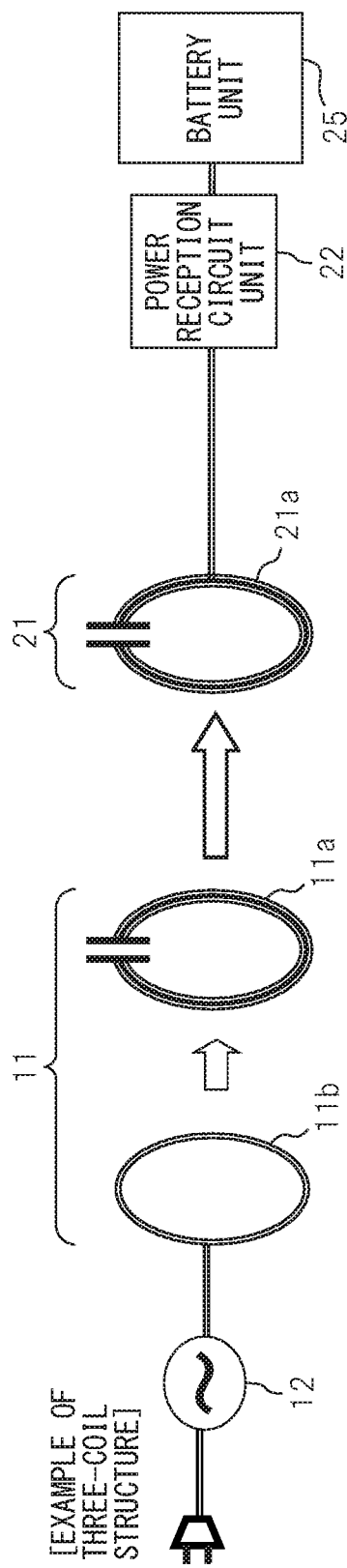

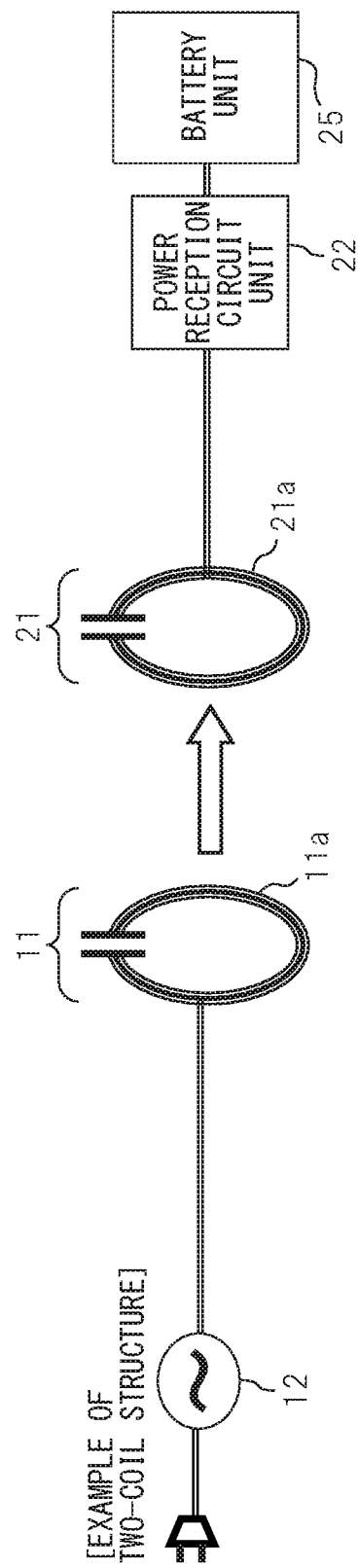

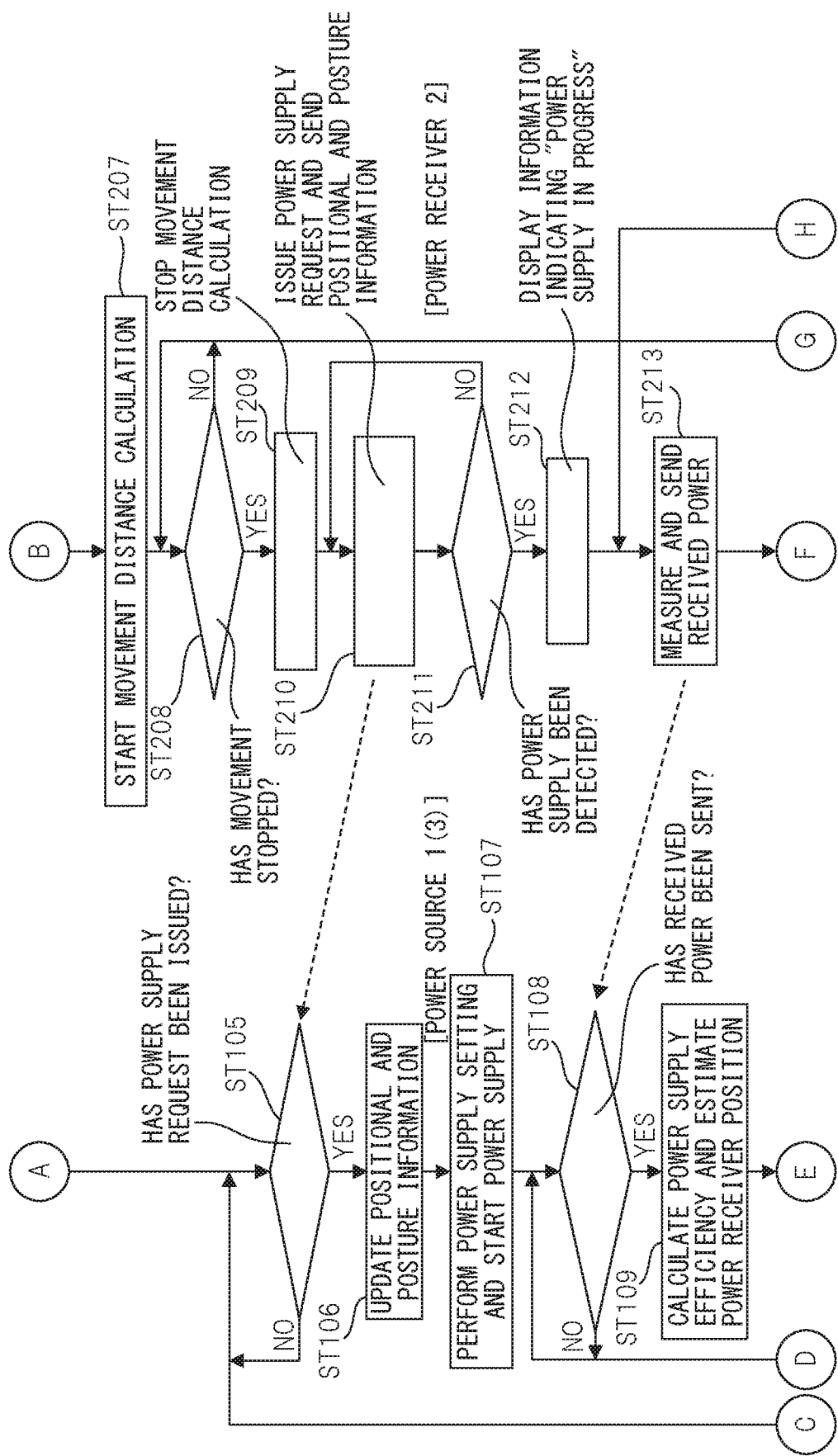

POWER SOURCE, WIRELESS POWER TRANSFER SYSTEM, AND POSITIONAL INFORMATION CALCULATION METHOD OF POWER RECEIVER

CROSS-REFERENCE TO RELATED APPLICATION

This application is a continuation application and is based upon PCT/JP2015/055274, filed on Feb. 24, 2015, the entire contents of which are incorporated herein by reference.

FIELD

The present invention relates to a power source, a wireless power transfer system, and a positional information calculation method of a power receiver.

BACKGROUND

In recent years, in order to perform power supply or perform charging, wireless power transfer techniques have been gaining attention. Research and development are being conducted regarding a wireless power transfer system wirelessly performing power transfer to various electronic apparatuses such as mobile terminals and notebook computers and household electrical appliances or to power infrastructure equipment.

When wireless power transfer is used, standardization is preferably performed so that power sources which transmit power and power receivers which receive the power transmitted from the power sources are used without trouble even when they are products manufactured by different manufacturers.

Generally, as wireless power transfer (wireless power transmission or wireless power supply), techniques which use electromagnetic induction or radio waves are known, and wireless power supply is getting prevalent in electronic devices such as portable terminals.

Recently, wireless power transfer techniques using strong coupling resonance have been attracting attention as techniques being capable of transferring power to a plurality of power receivers while placing each power receiver at a certain distance from a power source, or to various three-dimensional positions of each power receiver. Wireless power transfer techniques using magnetic field resonance or electric field resonance, for example, are known as this kind of wireless power transfer using strong coupling resonance.

In other words, as schemes for transferring power on the order of several watts at a distance of several centimeters to several tens of centimeters, magnetic field coupling schemes which apply coils to both power sources and power receivers, for example, are commonly used. Such power transfer schemes which use magnetic fields include the conventionally known electromagnetic induction scheme, and a magnetic field resonance scheme recently proposed by MIT (Massachusetts Institute of Technology) in the U.S.A.

The electromagnetic induction scheme includes, for example, the Qi (Chi) (registered trademark) standard introduced by the WPC (Wireless Power Consortium), and the magnetic field resonance scheme includes, for example, the WiPower (registered trademark) standard introduced by the A4WP (Alliance for Wireless Power).

In these wireless power transfer techniques, standardization is under development assuming as targets extra 100-W household electrical appliances, including microelectronic devices on the order of several watts in the phase of practical application. The development of wireless power supply techniques on the order of several kilowatts is also making progress for electrical vehicles mainly by automobile manufacturers.

Conventionally, in order to perform power supply or perform charging, various wireless power transfer techniques for wirelessly transferring power have been proposed, as described earlier. Among these techniques, the magnetic field resonance scheme advantageously allows the power supply distance to be longer than the electromagnetic induction scheme and the degree of freedom to be high in terms of the positions and the postures of power receivers.

The magnetic field resonance scheme may also implement power supply from one power source to a plurality of power receivers, and therefore promises to expand the market with an improvement in convenience in the future. Especially for the postures of power receivers, a three-dimensional wireless power transfer technique has also been proposed for generating an appropriate synthetic magnetic field by control according to the postures of the power receivers while synchronizing outputs from power source coils to perform highly efficient power supply to the power receivers.

In the magnetic field resonance scheme, since a near-field magnetic field is used to transmit energy, a problem in principle is posed in which the power transfer efficiency varies depending on the posture and the distance between the power source and the power receiver. It is, therefore, difficult to set precise power supply conditions unless the posture and the position of the power receiver relative to the power source are detected in any way.

In power transfer which employs the magnetic field resonance scheme, a method of conducting test power transfer using weak energy at the start of power transfer to achieve appropriate output setting of the power source in a cut-and-try manner is conceivable.

However, when, for example, three-dimensional wireless power transfer is performed using a synthetic magnetic field generated by power sources, the control method is so complex that a method of calculating the postures and the positions of the power receivers relative to the power sources, especially, their initial values is demanded.

In other words, when power transfer (power supply) is started with the posture and the position of the power receiver relative to the power source being left unknown, it takes a long time to perform processing such as test power transfer, resulting in considerable delay in actual power transfer from the power source to the power receiver. Although wireless power transfer which uses magnetic field resonance will be mainly taken as an example in this specification, the application of the present embodiment is not limited to magnetic field resonance, as a matter of course.

In the related art, various wireless power transfer techniques are proposed.

Patent Document 1: Japanese Laid-open Patent Publication No. 2012-023950

Non-Patent Document 1: A. Kurs, et al., "Wireless Power Transfer via Strongly Coupled Magnetic Resonances," SCIENCE Vol. 317, pp. 83-86, Jul. 6, 2007

Non-Patent Document 2: "System Description Wireless Power Transfer," Wireless Power Consortium, Volume I: Low Power, Part 1: Interface Definition, Version 1.1.2, June 2013

Non-Patent Document 3: R. Tseng, et al., "Introduction to the Alliance for Wireless Power Loosely-Coupled Wireless Power Transfer System Specification Version 1.0," (Reprinted from) IEEE Wireless Power Transfer Conference 2013, Technologies, Systems and Applications, pp. 1-6, May 15-16, 2013

Non-Patent Document 4: J. Nadakuduti, et al., "Operating Frequency Selection for Loosely Coupled Wireless Power Transfer Systems with Respect to RF Emissions and RF Exposure Requirements," (Reprinted from) IEEE Wireless Power Transfer Conference 2013, Technologies, Systems and Applications, pp. 1-6, May 15-16, 2013

Non-Patent Document 5: "A4WP Wireless Power Transfer System Baseline System Specification (BSS)," TWC of A4WP, Ver. 1.2, Nov. 21, 2013

SUMMARY

According to an aspect of the embodiments, there is provided a power source including a power source coil, a power transfer control unit, and a power receiver detection unit.

The power source coil is configured to wirelessly transfer power to a power receiver using one of magnetic field resonance and electric field resonance, and the power transfer control unit is configured to control the power source coil. Further, the power receiver detection unit is configured to detect the power receiver by bringing the power receiver into proximity thereto or contact therewith.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A, FIG. 4B, and FIG. 4C are diagrams for illustrating modified examples of a transmission coil in the wireless power transfer system of FIG. 3;

FIG. 15A, FIG. 15B, and FIG. 15C are flowcharts each depicting one example of wireless power transfer processing in the wireless power transfer system of the present embodiment.

DESCRIPTION OF EMBODIMENTS

First, before describing embodiments of a power source, a wireless power transfer system, and a positional information calculation method of a power receiver in detail, an example of a power transfer system and a problem posed in one example of a three-dimensional wireless power transfer system will be described, with reference to FIG. 1 to FIG. 7C.

Figure 1A:
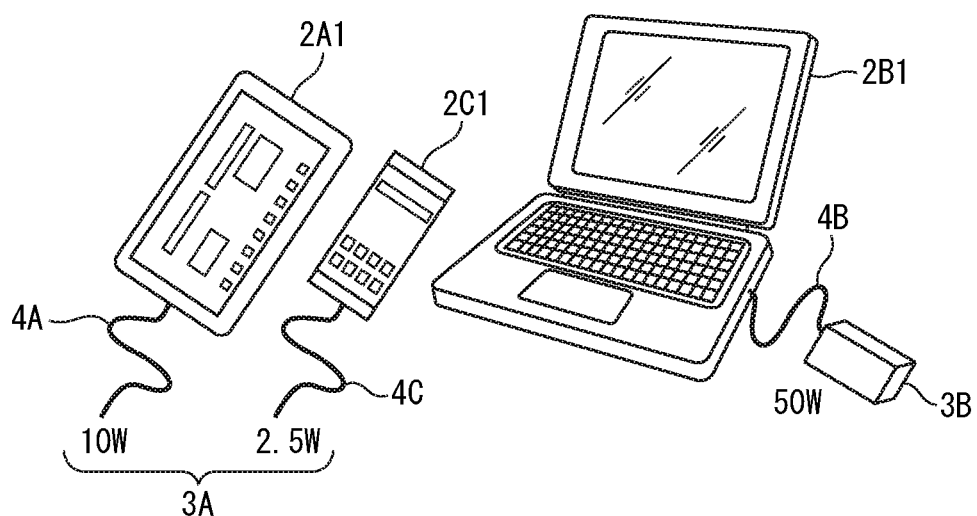
FIG. 1A is a diagram schematically depicting one example of a wired power transfer system.
Figure 1B:
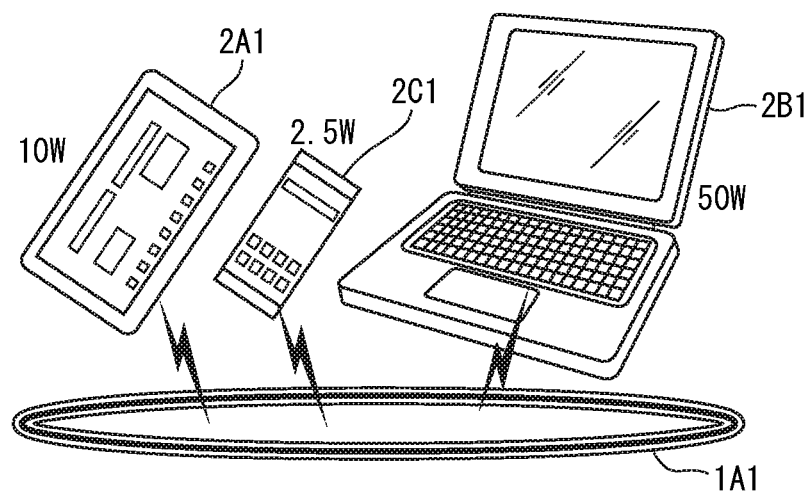
FIG. 1B is a diagram schematically depicting one example of a wireless power transfer system.

FIG. 1A is a diagram schematically depicting one example of a wired power transfer (wired power supply) system and FIG. 1B is a diagram schematically depicting one example of a wireless power transfer (wireless power supply) system. Referring to FIG. 1A and FIG. 1B, reference signs 2A1 to 2C1 denote power receivers.

The power receiver 2A1 represents, for example, a tablet computer (tablet) having a power requirement of 10 W, the power receiver 2B1 represents, for example, a notebook computer having a power requirement of 50 W, and the power receiver 2C1 represents, for example, a smartphone having a power requirement of 2.5 W. The power requirements correspond to, for example, powers for charging the rechargeable batteries (secondary batteries) in the respective power receivers 2A1 to 2C1.

As depicted in FIG. 1A, generally, when the secondary batteries of the tablet 2A1 and the smartphone 2C1 are charged, for example, the tablet 2A1 and the smartphone 2C1 are connected to a USB (Universal Serial Bus) terminal (or a dedicated power supply or the like) 3A of a Personal Computer via power supply cables 4A and 4C. When the secondary battery of the notebook computer 2B1 is charged, for example, the notebook computer 2B1 is connected to a dedicated power supply (AC-DC Converter) 3B via a power supply cable 4B.

In other words, even for the portable power receivers 2A1 to 2C1, power supply (wired power transfer) is generally performed by wire connection from the USB terminal 3A and the power supply 3B using the power supply cables 4A to 4C, as depicted in FIG. 1A.

In this case, for example, since the power supply cables 4A to 4C are connected to the power receivers 2A1 to 2C1, respectively, via connectors, detecting, for each connector, a power receiver (connection device) connected to the end of the connector may detect the number of devices and fix the supplied power in accordance with the connector shape. The user connects a power supply cable in accordance with the power requirement to recognize the power requirement and appropriately supply power to each connection device.

With the recent advance in non-contact power supply technology typified by electromagnetic induction, for example, wireless power supply (wireless power transfer) has come into practice in a shaver or an electric toothbrush. For example, power may be wirelessly transferred from a power source 1A1 to the tablet 2A1, the notebook computer 2B1, and the smartphone 2C1, as depicted in FIG. 1B.

Figure 2A:
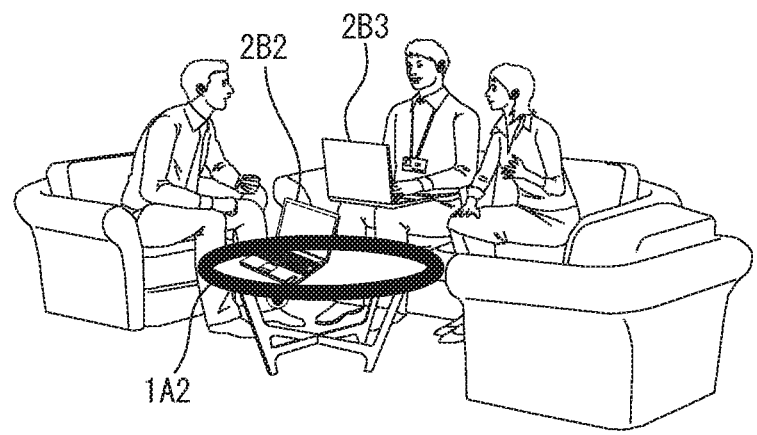
FIG. 2A is a diagram schematically depicting one example of a two-dimensional wireless power transfer system.

FIG. 2A is a diagram schematically depicting one example of a two-dimensional wireless power transfer (two-dimensional wireless power supply) system, and illustrates, for example, how power is wirelessly transferred by electromagnetic induction, as in, for example, the above-mentioned shaver or electric toothbrush.

As depicted in FIG. 2A, when power is wirelessly transferred using electromagnetic induction, power may be supplied to only a power receiver which is nearly in contact with a power source 1A2 because of the short power transfer distance even in non-contact power supply.

In other words, although power may be supplied to a power receiver (notebook computer) 2B2 placed on the power source (power receiver mount) 1A2, it is difficult to supply power to a notebook computer 2B3 separated from the power receiver mount 1A2. In this manner, the wireless power transfer system depicted in FIG. 2A serves as a two-dimensional wireless power supply system which enables free arrangement on the power receiver mount 1A2.

Figure 2B:
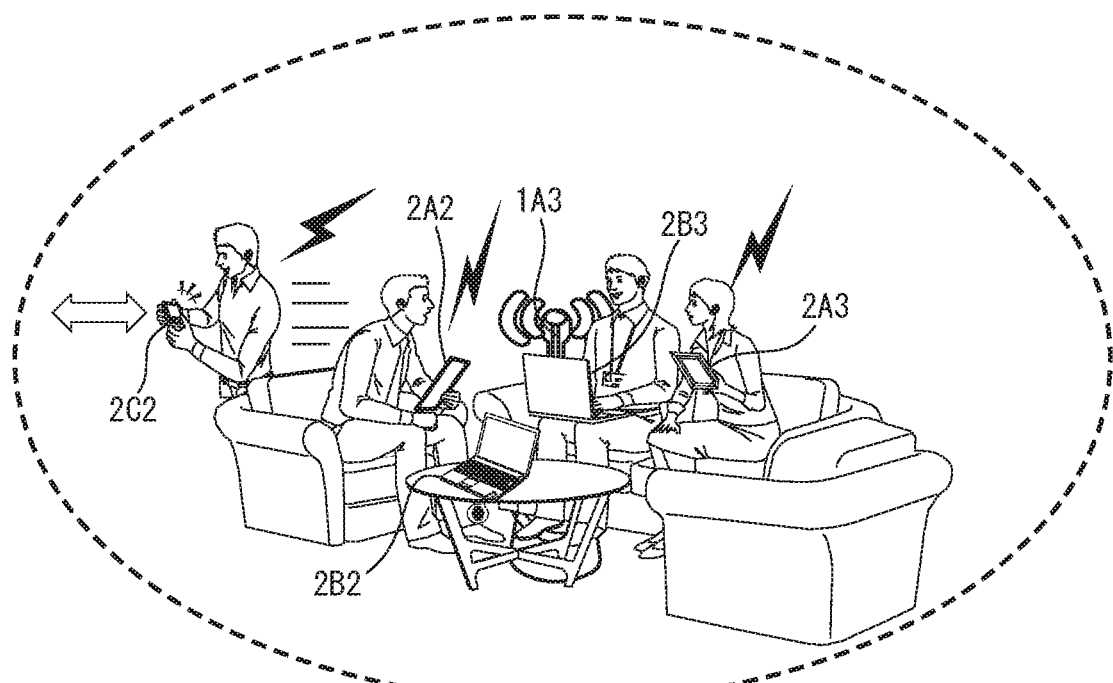
FIG. 2B is a diagram schematically depicting one example of a three-dimensional wireless power transfer system.

FIG. 2B is a diagram schematically depicting one example of a three-dimensional wireless power transfer (three-dimensional wireless power supply) system, and illustrates, for example, how power is wirelessly transferred using magnetic field resonance or electric field resonance. As depicted in FIG. 2B, when power is wirelessly transferred using magnetic field resonance or electric field resonance, power may be supplied from the power source 1A2 to a plurality of power receivers which fall within a predetermined range (the interior of a broken line in FIG. 2B).

In other words, power may be wirelessly transferred from a power source 1A3 to tablets 2A2 and 2A3, the notebook computers 2B2 and 2B3, and a smartphone 2C2 that fall within a predetermined range. Although FIG. 2B depicts only one power source 1A3, a plurality of power sources wirelessly transfer power to a plurality of power receivers at various angles and positions, using magnetic field resonance or electric field resonance.

In this manner, the wireless power transfer system depicted in FIG. 2B serves as, for example, a three-dimensional wireless power supply system which uses magnetic field resonance to enable a high power transfer efficiency even in a space farther than that using electromagnetic induction.

Figure 3:
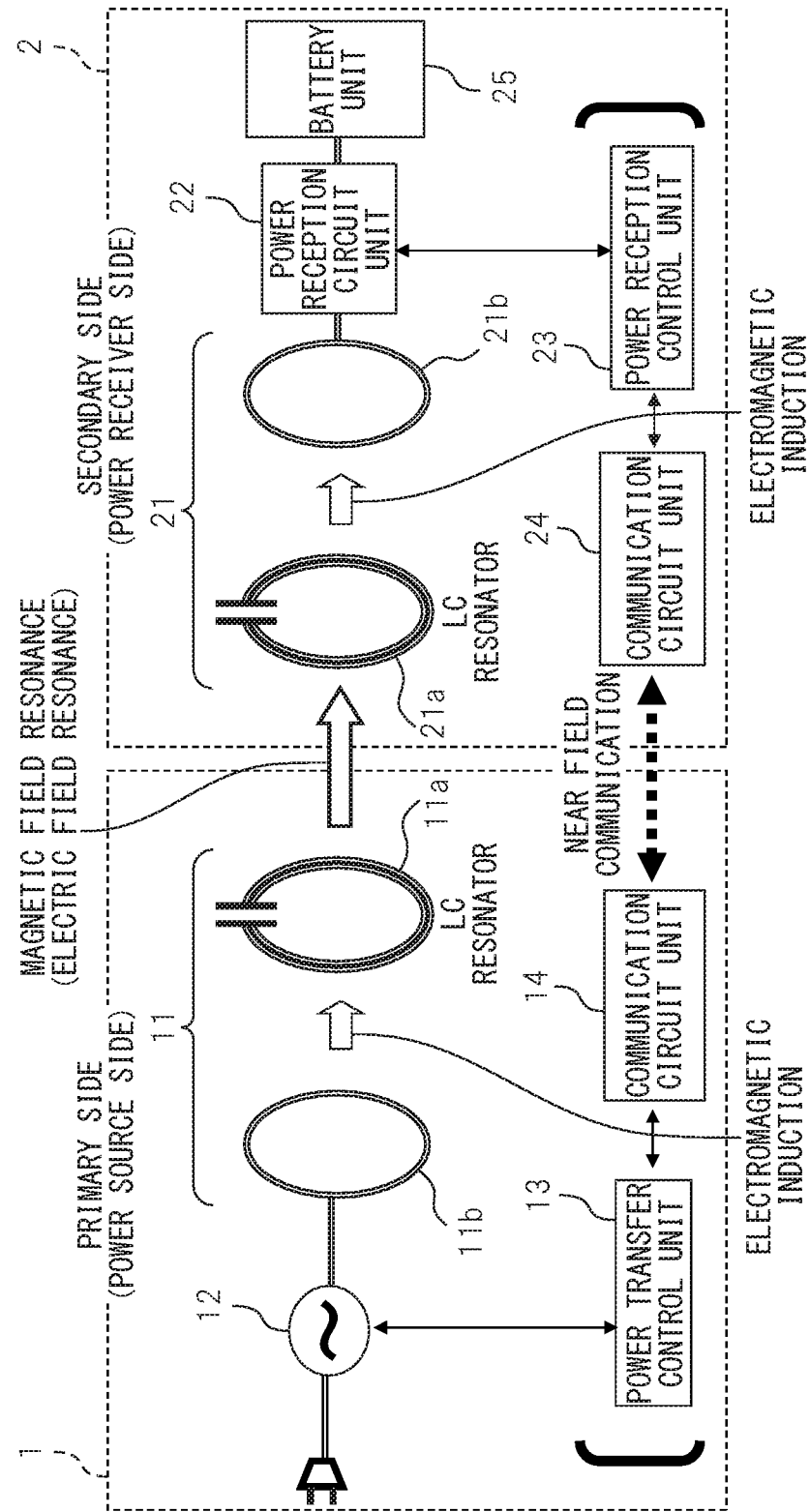
FIG. 3 is a block diagram schematically depicting one example of a power source and a power receiver in a wireless power transfer system.

FIG. 3 is a block diagram schematically depicting one example of a power source and a power receiver in a wireless power transfer (three-dimensional wireless power supply) system. In FIG. 3, reference sign 1 denotes a primary side (a power source side: a power source), and reference sign 2 denotes a secondary side (a power receiver side: a power receiver).

As depicted in FIG. 3, the power source 1 includes a wireless power transfer unit 11, a high frequency power supply unit 12, a power transfer control unit 13, and a communication circuit unit (a first communication circuit unit) 14. In addition, the power receiver 2 includes a wireless power reception unit 21, a power reception circuit unit (a rectifier unit) 22, a power reception control unit 23, and a communication circuit unit (a second communication circuit unit) 24.

The wireless power transfer unit 11 includes a first coil (a power supply coil) 11$b$ and a second coil (a power source resonance coil: a power source coil) 11$a$, and the wireless power reception unit 21 includes a third coil (a power receiver resonance coil: a power receiver coil) 21$a$ and a fourth coil (a power extraction coil) 21$b$.

As depicted in FIG. 3, the power source 1 and the power receiver 2 perform energy (electric power) transmission from the power source 1 to the power receiver 2 by magnetic field resonance (electric field resonance) between the power source resonance coil 11$a$ and the power receiver resonance coil 21$a$. Power transfer from the power source resonance coil 11$a$ to the power receiver resonance coil 21$a$ may be performed not only by magnetic field resonance but also electric field resonance or the like. However, the following description will be given mainly by way of example of magnetic field resonance.

The power source 1 and the power receiver 2 communicate with each other (near field communication: out-band communication) by the communication circuit unit 14 and the communication circuit unit 24. Note that, a distance of power transfer (a power transfer range) by the power source resonance coil 11$a$ of the power source 1 and the power receiver resonance coil 21$a$ of the power receiver 2 is set to be shorter than a distance of communication (a communication range) by the communication circuit unit 14 of the power source 1 and the communication circuit unit 24 of the power receiver 2.

In addition, power transfer by the power source resonance coil 11$a$ and the power receiver resonance coil 21$a$ is performed by a system (an out-band communication) independent from communication by the communication circuit units 14 and 24. Specifically, power transfer by the resonance coils 11$a$ and 21$a$ uses, for example, a frequency band of 6.78 MHz, whereas communication by the communication circuit units 14 and 24 uses, for example, a frequency band of 2.4 GHz.

The communication by the communication circuit units 14 and 24 may use, for example, a DSSS wireless LAN system based on IEEE 802.11b or Bluetooth (registered trademark).

The above-described wireless power transfer system performs power transfer using magnetic field resonance or electric field resonance by the power source resonance coil 11$a$ of the power source 1 and the power receiver resonance coil 21$a$ of the power receiver 2, for example, in a near field at a distance about ⅙ of the wavelength of a frequency used. Accordingly, the range of power transfer (a power transfer range) varies with the frequency used for power transfer.

The high frequency power supply unit 12 supplies power to the power supply coil (the first coil) 11$b$, and the power supply coil 11$b$ supplies power to the power source resonance coil 11$a$ arranged very close to the power supply coil 11$b$ by using electromagnetic induction. The power source resonance coil 11$a$ transfers power to the power receiver resonance coil 21$a$ (the power receiver 2) at a resonance frequency that causes magnetic field resonance between the resonance coils 11$a$ and 21$a$.

The power receiver resonance coil 21$a$ supplies power to the power extraction coil (the fourth coil) 21$b$ arranged very close to the power receiver resonance coil 21$a$, by using electromagnetic induction. The power extraction coil 21$b$ is connected to the power reception circuit unit 22 to extract a predetermined amount of power. The power extracted from the power reception circuit unit 22 is used, for example, for charging a battery in a battery unit (load) 25, as a power supply output to the circuits of power receiver 2, or the like.

Note that, the high frequency power supply unit 12 of the power source 1 is controlled by the power transfer control unit 13, and the power reception circuit unit 22 of the power receiver 2 is controlled by the power reception control unit 23. Then, the power transfer control unit 13 and the power reception control unit 23 are connected via the communication circuit units 14 and 24, and adapted to perform various controls so that power transfer from the power source 1 to the power receiver 2 may be performed in an optimum state.

Figure 4B:
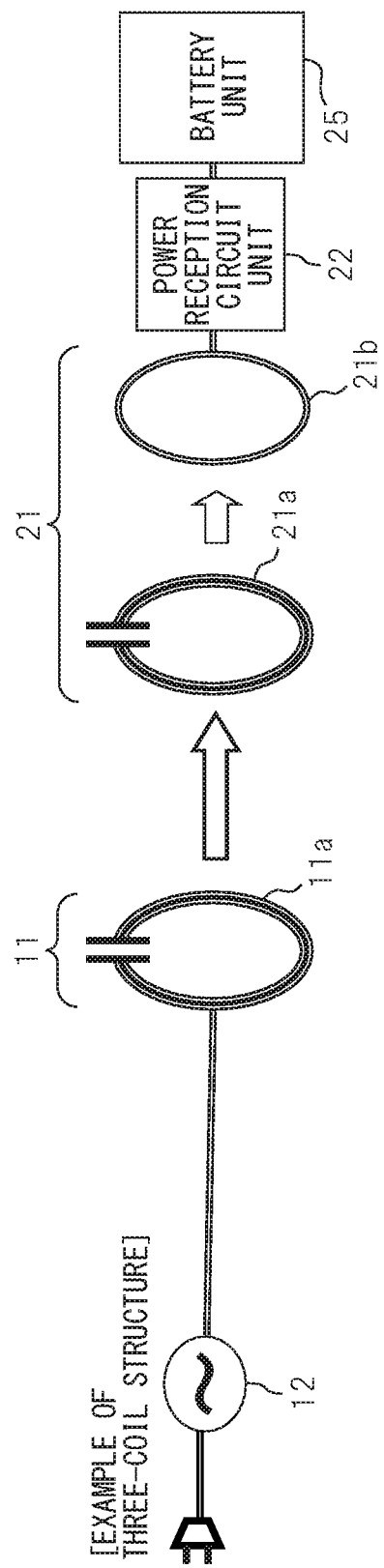

FIG. 4A to FIG. 4C are diagrams for illustrating modified examples of a transmission coil in the wireless power transfer system of FIG. 3. Note that, FIG. 4A and FIG. 4B depict exemplary three-coil structures, and FIG. 4C depicts an exemplary two-coil structure.

Specifically, in the wireless power transfer system depicted in FIG. 3, the wireless power transfer unit 11 includes the first coil 11b and the second coil 11a, and the wireless power reception unit 21 includes the third coil 21a and the fourth coil.

On the other hand, in the example of FIG. 4A, the wireless power reception unit 21 is set as a single coil (a power receiver resonance coil: an LC resonator) 21a, and in the example of FIG. 4B, the wireless power transfer unit 11 is set as a single coil (a power source resonance coil: an LC resonator) 11a.

Further, in the example of FIG. 4C, the wireless power reception unit 21 is set as a single power receiver resonance coil 21a and the wireless power transfer unit 11 is set as a single power source resonance coil 11a. Note that, FIG. 4A to FIG. 4C are merely examples and, obviously, various modifications may be made.

FIG. 5A to FIG. 5D are circuit diagrams depicting examples of an independent resonance coil (the power receiver resonance coil 21a), and FIG. 6A to FIG. 6D are circuit diagrams depicting examples of a resonance coil (the power receiver resonance coil 21a) connected to a load or a power supply.

Note that, FIG. 5A to FIG. 5D correspond to the power receiver resonance coil 21a of FIG. 3 and FIG. 4B, and FIG. 6A to FIG. 6D correspond to the power receiver resonance coil 21a of FIG. 4A and FIG. 4C.

Figure 5A:
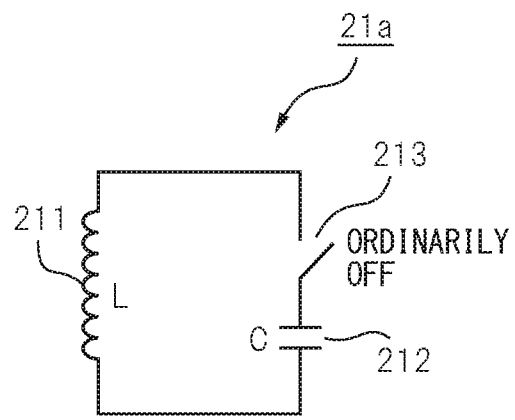
FIG. 5A, FIG. 5B, FIG. 5C, and FIG. 5D are circuit diagrams depicting examples of an independent resonance coil.
Figure 5B:
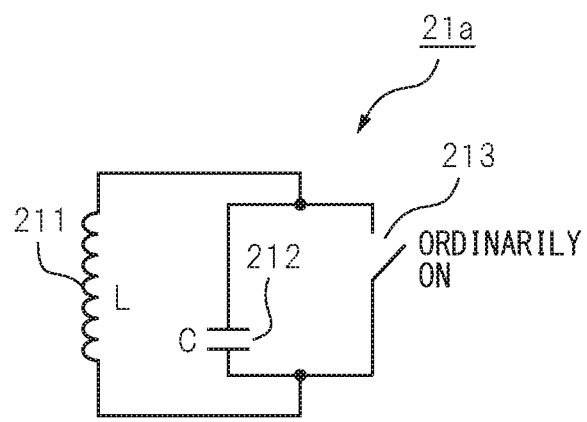
Figure 6A:
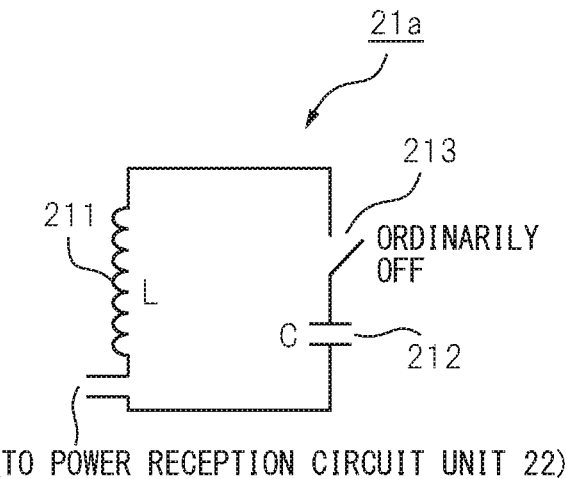
FIG. 6A, FIG. 6B, FIG. 6C, and FIG. 6D are circuit diagrams depicting examples of a resonance coil connected to a load or a power supply.

In the examples depicted in FIG. 5A and FIG. 6A, the power receiver resonance coil 21a includes a coil (L) 211, a capacitor (C) 212, and a switch 213 connected in series, in which the switch 213 is ordinarily in an off-state. In the examples depicted in FIG. 5B and FIG. 6B, the power receiver resonance coil 21a includes the coil (L) 211 and the capacitor (C) 212 connected in series, and the switch 213 connected in parallel to the capacitor 212, in which the switch 213 is ordinarily in an on-state.

Figure 5C:
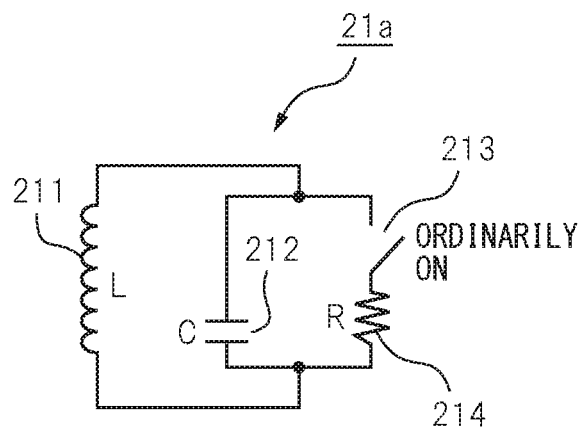
Figure 6B:
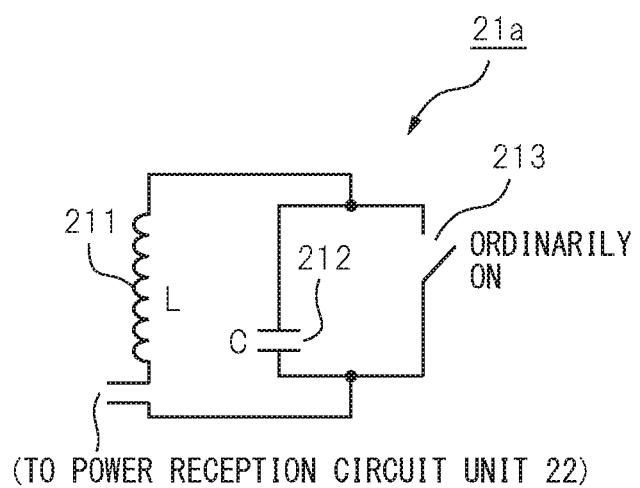
Figure 6C:
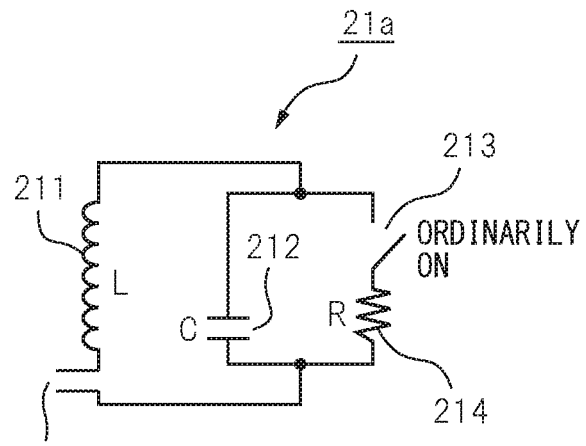

In the examples depicted in FIG. 5C and FIG. 6C, the power receiver resonance coil 21a of FIG. 5B and FIG. 6B includes the switch 213 and the resistance (R) 214 connected in series and arranged in parallel to the capacitor 212, in which the switch 213 is ordinarily in the on-state.

Figure 5D:
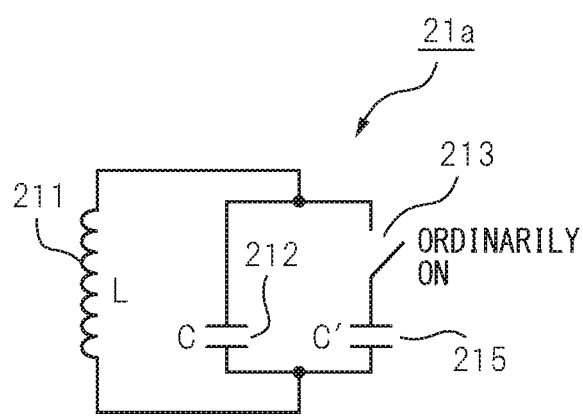
Figure 6D:
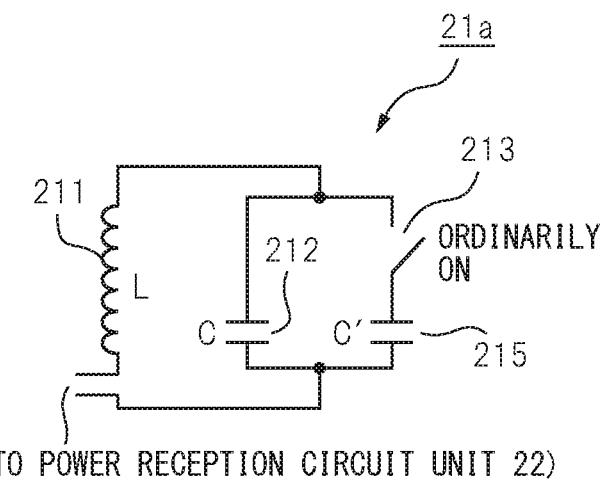

The examples of FIG. 5D and FIG. 6D depict the power receiver resonance coil 21a of FIG. 5B and FIG. 6B, in which the switch 213 and another capacitor (C') 215 connected in series are arranged in parallel to the capacitor 212, and the switch 213 is ordinarily in the on-state.

In each of the power receiver resonance coils 21a described above, the switch 213 is set to "off" or "on" so that the power receiver resonance coil 21a does not operate ordinarily. The reason for this is, for example, to prevent heat generation or the like caused by power transfer to a power receiver 2 not in use (on power receiver) or to a power receiver 2 out of order.

In the above structure, the power source resonance coil 11a of the power source 1 may also be set as in FIG. 5A to FIG. 5D and FIG. 6A to FIG. 6D. However, the power source resonance coil 11a of the power source 1 may be set so as to operate ordinarily and may be controlled to be turned ON/OFF by an output of the high frequency power supply unit 12. In this case, in the power source resonance coil 11a, the switch 213 is to be short-circuited in FIG. 5A and FIG. 6A.

In this manner, when a plurality of power receivers 2 are present, selecting only the power receiver resonance coil 21a of a predetermined power receiver 2 for receiving power transmitted from the power source 1 and making the power receiver resonance coil 21a operable enables power to be transferred (time-division power transfer) to the selected power receiver 2.

Figure 7A:
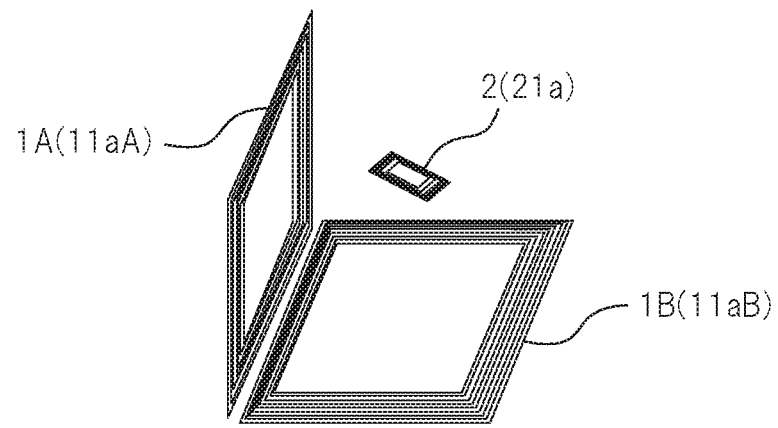
FIG. 7A, FIG. 7B, and FIG. 7C are diagrams for illustrating examples of controlling a magnetic field by a plurality of power sources.
Figure 7B:
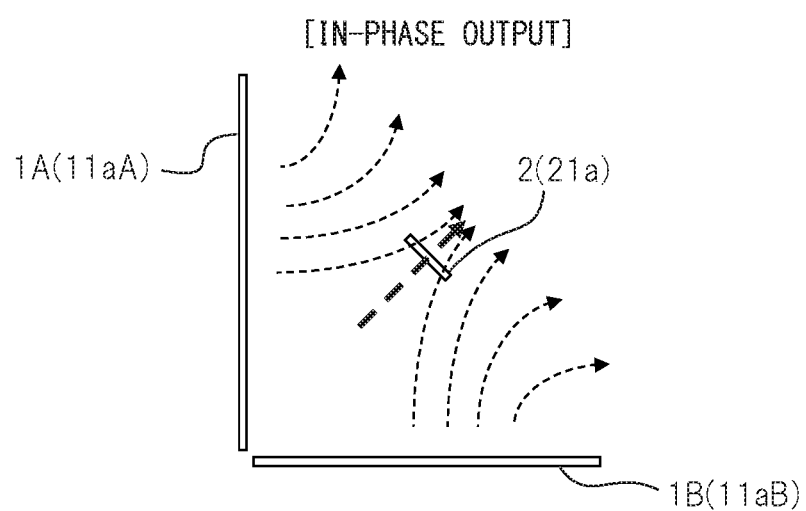
Figure 7C:
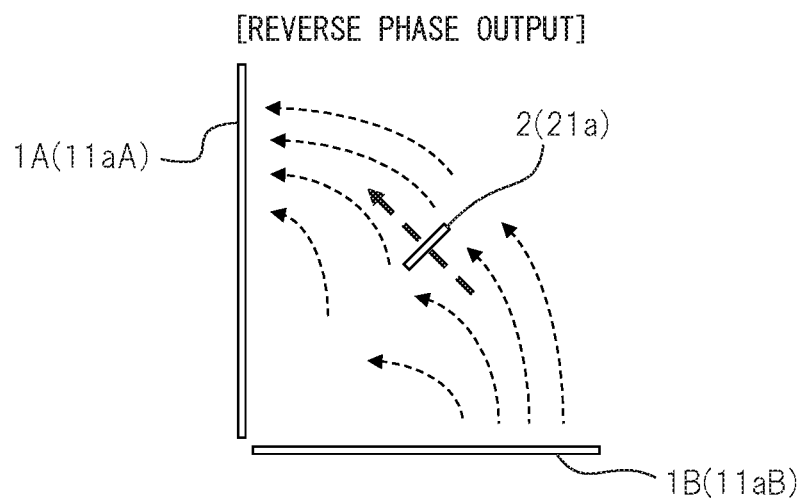

FIG. 7A to FIG. 7C are diagrams for illustrating examples of controlling a magnetic field by a plurality of power sources. In FIG. 7A to FIG. 7C, reference signs 1A and 1B denote power sources, and reference sign 2 denotes a power receiver.

As depicted in FIG. 7A, a power source resonance coil 11aA for power transfer used for magnetic field resonance of the power source 1A and a power source resonance coil 11aB for power transfer used for magnetic field resonance of the power source 1B are arranged, for example, so as to be orthogonal to each other.

Further, the power receiver resonance coil 21a used for magnetic field resonance of the power receiver 2 is arranged at a different angle (an angle not parallel) at a position surrounded by the power source resonance coils 11aA and 11aB.

Note that, the power source resonance coils (LC resonators) 11aA and 11aB may also be provided in a single power source. In other words, a single power source 1 may include a plurality of wireless power transfer units 11.

FIG. 7B depicts a situation in which the power source resonance coils 11aA and 11aB output an in-phase magnetic field, and FIG. 7C depicts a situation in which the power source resonance coils 11aA and 11aB output a reverse phase magnetic field.

For example, by comparing the cases where the two orthogonal power source resonance coils 11aA and 11aB output an in-phase magnetic field and a reverse phase magnetic field, a synthesized magnetic field becomes a 90° rotation relationship in each other, so that power transfer is carried out to each power receiver 2 (power receiver resonance coil 21a) with suitably transmitting from the power source resonance coils 11aA and 11aB based on the postures of the power receiver 2.

As described above, when power is transferred to the power receiver 2 positioned at an arbitrary position and an arbitrary posture (angle) by the plurality of power sources 1A and 1B, magnetic fields occurring in the power source resonance coils 11aA and 11aB of the power sources 1A and 1B change variously.

The above-mentioned wireless power transfer system includes a plurality of power sources and at least one power receiver and adjusts outputs (strengths and phases) between the plurality of power sources according to positions (X, Y and Z) and postures ($\theta_X$, $\theta_Y$ and $\theta_Z$) of the power receiver.

In addition, it will be seen that, with respect to three-dimensional space, for example, using three or more power sources in the actual three-dimensional space to adjust the respective output phase differences and the output intensity ratios may control the magnetic field (electric field) to any direction in the three-dimensional space.

A wireless power transfer system which employs the magnetic field resonance scheme has, for example, the advantage of exhibiting a high degree of freedom regarding the position and the posture of the power receiver 2, as described above. However, in the magnetic field resonance scheme, the use of a near-field magnetic field to transmit energy poses a problem in principle in which the efficiency varies depending on the posture and the distance between the power source and the power receiver.

It is, therefore, difficult to set precise power supply conditions unless the posture and the position of the power receiver relative to the power source are detected in any way. In power transfer which employs the magnetic field resonance scheme, a method of conducting test power transfer using weak energy at the start of power transfer to achieve appropriate output setting of the power source in a cut-and-try manner is conceivable.

However, when, for example, three-dimensional wireless power transfer is performed using a synthetic magnetic field generated by power sources, the control method is so complex that a method of calculating the postures and the positions of the power receivers relative to the power sources, especially, their initial values is demanded.

Portable terminals including the recent smartphones generally incorporate devices such as acceleration sensors or geomagnetic sensors, which may be used to calculate the posture and the position of the power receiver relative to the power source.

For example, a movement distance can be calculated by calculating the second-order integral of an acceleration sensor, and the posture in the pitch and roll directions (with respect to the ground) can be estimated by detecting the gravitational direction using the acceleration sensor and performing vector decomposition into an orthogonal coordinate system. It is difficult for a geomagnetic sensor to obtain a position resolution on the order of several centimeters, but it is possible to detect the posture in the yaw direction.

In other words, the angle (posture) of the power receiver can be detected, for example, by gravitational vector decomposition output from an acceleration sensor for the pitch and roll directions, and by orientation detection using a geomagnetic sensor for the yaw direction.

For a motion of a smartphone or the like carried by the user, for example, the pitch direction means the direction of up-down rotation (movement) about an axis defined in the right-left direction, the roll direction means the direction of rotation about an axis defined in the front-back direction, and the yaw direction means the direction of rotation about an axis defined in the up-down direction.

However, in, for example, detection of a movement distance using the above-mentioned acceleration sensor of the portable terminal (power receiver), unless the initial position is determined, the position (absolute position) of the power receiver itself is unidentified and the position relative to the power source is therefore unknown.

When a movement distance is calculated by calculating the second-order integral of the acceleration sensor, another problem is posed in which the accuracy degrades upon accumulation of noise and offset components in the process of integral calculation. Independently of position detection, for example, since power supply may not be involved even upon entrance to the wireless power supply zone, a challenge arises in how to declare the user's intention to start wireless power supply.

Figure 8:
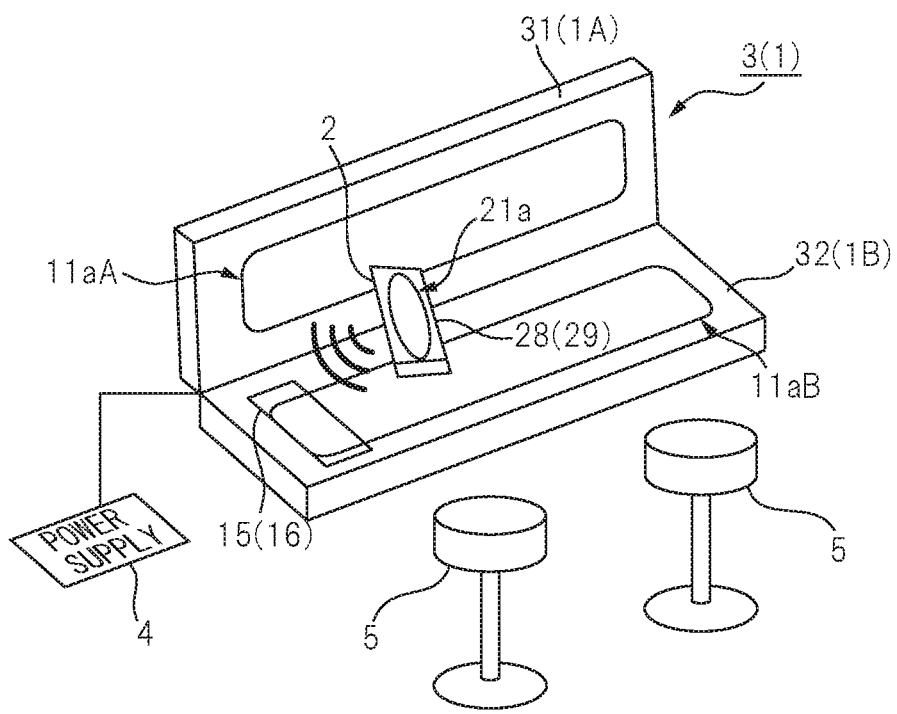
FIG. 8 is a diagram schematically depicting one example of a wireless power transfer system of the present embodiment.

Embodiments of a power source, a wireless power transfer system, and a positional information calculation method of a power receiver will be described in detail below with reference to the accompanying drawings. FIG. 8 is a diagram schematically depicting one example of a wireless power transfer system of the present embodiment, and illustrates an example in which two power source resonance coils (power source coils) 11*a*A and 11*a*B are provided on a table 3 (power source 1) forming a vertical L-shape to transfer power (supply power) to the power receiver 2.

In other words, FIG. 8 conceptually depicts how, in a space like in a coffee shop or an office lounge, the battery is charged by the table 3 having the wireless power supply function while a user sitting in a chair 5 operates a portable terminal (power receiver 2) such as a smartphone.

As depicted in FIG. 8, the table 3 includes a vertical plate (standing plate) 31 provided with a power source resonance coil 11*a*A and a horizontal plate (top plate) 32 provided with a power source resonance coil 11*a*B, and power is supplied to the power source resonance coils 11*a*A and 11*a*B from a power supply (commercial power supply) 4. FIG. 8 does not illustrate, for example, the high frequency power supply unit 12, the power transfer control unit 13, and the communication circuit unit 14 in the power source 1 (table 3) described with reference to FIG. 3.

The power source resonance coils 11*a*A and 11*a*B (vertical plate and horizontal plate) are, for example, provided orthogonally and used to perform three-dimensional wireless power supply to the power receiver 2.

The horizontal plate 32 of the table 3 includes, at its one end, a power receiver detection unit 15 (16) for detecting a power receiver 2, receiving the power supply specifications (charging information) of the power receiver 2, and performing, for example, authentication (mutual authentication) of the power receiver 2. The power supply specifications include, for example, information such as the capacity and remaining level of a battery provided in the power receiver 2. Mutual authentication between the power source and the power receiver allows confirmation of, for example, the necessity and permission of power supply to the power receiver.

The power source resonance coils are not limited to the orthogonal power source resonance coils 11*a*A and 11*a*B and can be arranged at different angles, and the number of power source resonance coils is not limited to two, either. As for the power receiver 2 supplied with power by the power source 1, power can be simultaneously supplied to a plurality of power receivers, as a matter of course.

The power source resonance coils 11*a*A and 11*a*B may be provided as those of separate power sources 1A and 1B, respectively. In this case, for example, the power receiver detection unit 15 of the power source 1B may be placed at one end of the horizontal plate 32 and the power source 1B may serve as a master to control the power source resonance coil 11*a*B of the power source 1B and the power source resonance coil 11*a*A of the power source 1A.

The power receiver 2 includes a reference position detection unit 28 (29) for performing, for example, ultra-short-range communication and two-dimensional code reading with the power receiver detection unit 15 (16) to perform, for example, setting of a reference position with respect to the table 3 (power sources 1A and 1B) and the above-mentioned authentication.

The power receiver detection unit 15 includes, for example, an antenna 15a and an ultra-short-range communication circuit unit 15b, and the reference position detection unit 28 includes an antenna 28a and an ultra-short-range communication circuit unit 28b. The power receiver detection unit 15 and the reference position detection unit 28 will be described below with reference to FIG. 10.

The power receiver detection unit 16 includes, for example, a two-dimensional code 16a and a two-dimensional code reading unit 16b, and the reference position detection unit 29 includes a two-dimensional code 29a and a two-dimensional code reading unit 29b. The power receiver detection unit 16 and the reference position detection unit 29 will be described below with reference to FIG. 11.

In the foregoing description, the location where a power receiver detection unit 15 (16) is provided is not limited to one end of the horizontal plate 32, and it may be a position such as one end of the vertical plate 31 or the center of the horizontal plate 32 or the vertical plate 31. In other words, since the power receiver 2 sets a reference position (origin) with respect to the power source 1 (table 3), the power receiver detection unit 15 or 16 (e.g., the antenna 15a or the camera 16b) may be placed anywhere as long as its position can be identified in advance.

Figure 9:
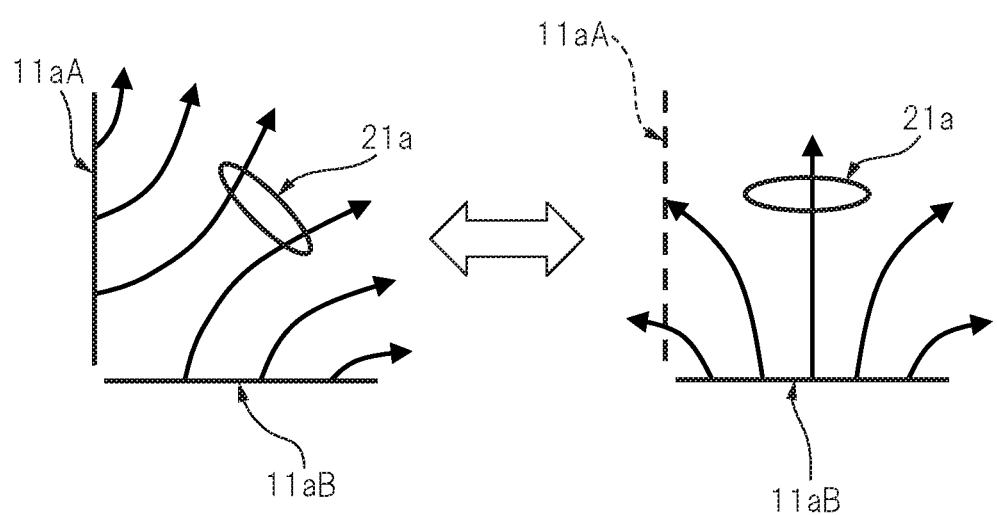
FIG. 9 is a diagram for illustrating power transfer by the three-dimensional wireless power transfer system depicted in FIG. 8.

FIG. 9 is a diagram for illustrating power transfer by the three-dimensional wireless power transfer system depicted in FIG. 8. Power can be transferred to a power receiver 2 (power receiver resonance coil 21a) in various positions and postures with high efficiency by controlling magnetic fields generated by the power source resonance coils 11aA and 11aB, as described with reference to FIG. 7A to FIG. 7C.

An example illustrated on the left of FIG. 9 corresponds to FIG. 7B mentioned above, and an example illustrated on the right of FIG. 9 depicts the case where the power source resonance coil 11aA is stopped and power is transferred only from the power source resonance coil 11aB to supply power.

In this manner, when power is transferred to a power receiver 2 in an arbitrary position and posture, power is supplied (power is transferred) by controlling magnetic fields generated by the power source resonance coils 11aA and 11aB on the basis of power supply conditions corresponding to the position and the posture of the power receiver 2.

Figure 10:
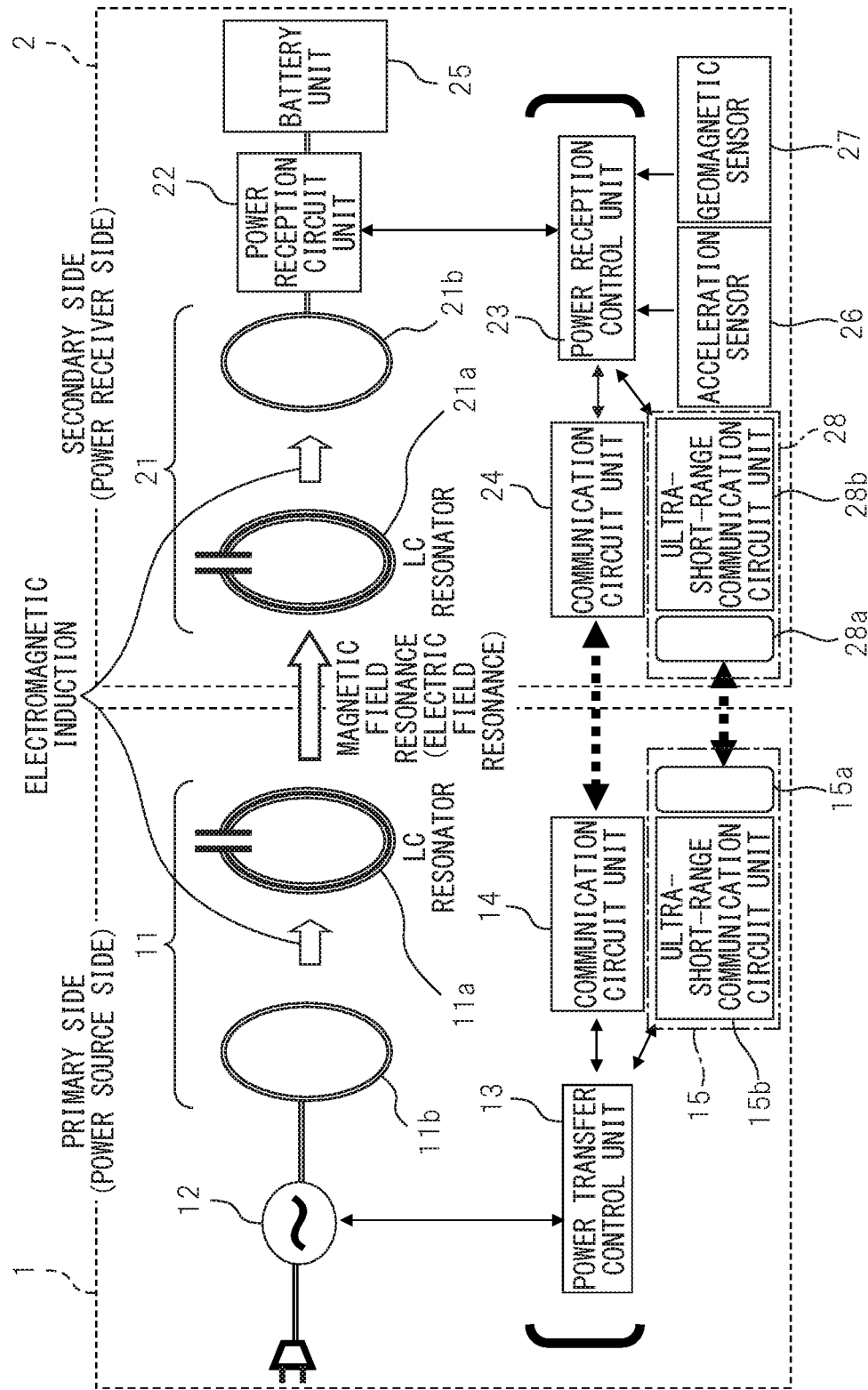
FIG. 10 is a block diagram schematically depicting a power source and a power receiver in one example of the wireless power transfer system of the present embodiment.

FIG. 10 is a block diagram schematically depicting a power source and a power receiver in one example of the wireless power transfer (three-dimensional wireless power supply) system of the present embodiment. As is obvious from a comparison between FIG. 10 and FIG. 3 described earlier, in the wireless power transfer system of the present embodiment, the power source 1 further includes an antenna (first antenna) 15a and an ultra-short-range communication circuit unit (first ultra-short-range communication circuit unit) 15b.

The power receiver 2 further includes an acceleration sensor (first sensor) 26, a geomagnetic sensor (second sensor) 27, an antenna (second antenna) 28a, and an ultra-short-range communication circuit unit (second ultra-short-range communication circuit unit) 28b. Ultra-short-range communication by the ultra-short-range communication circuit unit 15b of the power source 1 and the ultra-short-range communication circuit unit 28b of the power receiver 2 may be implemented by employing a technique for non-contact IC cards such as FeliCa (registered trademark) or MIFARE (registered trademark).

The antenna 15a of the ultra-short-range communication circuit unit 15b in the power source 1 is, for example, placed at one end of the horizontal plate 32 and used to perform ultra-short-range communication by bringing the antenna 28a of the ultra-short-range communication circuit unit 28b in the power receiver 2 into proximity to the antenna 15a, as described with reference to FIG. 8.

Communication by the communication circuit unit (first communication circuit unit) 14 of the power source 1 and the communication circuit unit (second communication circuit unit) 24 of the power receiver 2 employs, for example, a DSSS wireless LAN system based on IEEE 802.11b or Bluetooth (registered trademark), as described earlier.

In the foregoing description, two-dimensional codes (e.g., QR codes (registered trademark)) may be provided in both the power source 1 and the power receiver 2, instead of providing a communication function by the ultra-short-range communication circuit unit 15b (antenna 15a) of the power source 1 and the ultra-short-range communication circuit unit 28b (antenna 28a) of the power receiver 2.

Figure 11:
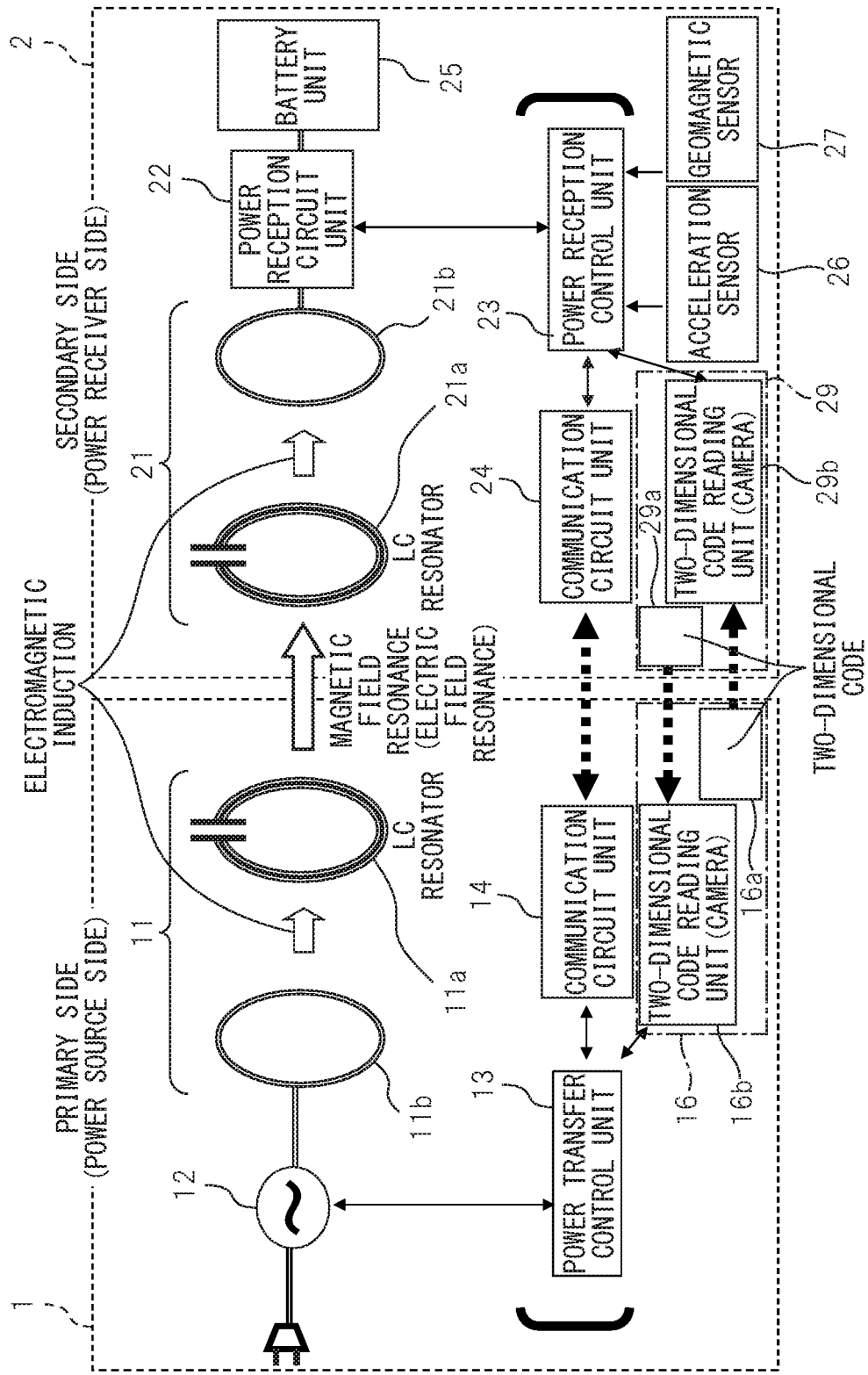
FIG. 11 is a block diagram schematically depicting a power source and a power receiver in a modified example of the wireless power transfer system depicted in FIG. 10.

FIG. 11 is a block diagram schematically depicting a power source and a power receiver in a modified example of the wireless power transfer system depicted in FIG. 10. As is obvious from a comparison between FIG. 11 and FIG. 10 described above, in this modified example, two-dimensional codes 16a and 29a and two-dimensional code reading units (cameras) 16b and 29b are provided in place of the ultra-short-range communication circuit units 15b and 28b (antennas 15a and 28a).

As the user, for example, starts an application (application software) for power supply (charging) held in the power receiver 2 (e.g., a portable terminal such as a smartphone), the two-dimensional code 29a will be displayed on a display (not illustrated) of the power receiver 2.

The power receiver 2, for example, is held over a predetermined position (the position where the power receiver detection unit 15 is placed: e.g., one end of the horizontal plate 32 of the table 3) in the power source 1 to read the two-dimensional code 29a displayed on the display of the power receiver 2 by the camera 16b of the power source 1.

With this operation, the power source 1 can recognize, for example, power supply specifications such as the battery capacity and remaining level of the power receiver 2. The two-dimensional code 29a may be, for example, printed on the surface of the power receiver 2 instead of being displayed on the display of the power receiver 2.

The camera 16b of the power source 1 can even read the two-dimensional code 29a of the power receiver 2 to authenticate whether, for example, power may be supplied to the power receiver 2. This authentication processing of the power receiver 2 by the power source 1 allows, for example, permission of power supply from the power source 1 only to a power receiver 2 having a power receiver contract made in advance, or control of billing upon power supply.

Further, for example, the two-dimensional code 16a can be printed at a predetermined position in the power source 1 and read by the camera 29b of the power receiver 2 to set a reference position, as well as the above-mentioned authentication processing.

Even in the power source 1, for example, a display (not illustrated) may be provided and the two-dimensional code 16a may be displayed on the display to read the two-dimensional code 16a displayed on the display using the camera 29b of the power receiver 2.

When, for example, the position of the two-dimensional code 16a on the display of the power source 1 is associated with the camera 29b of the power receiver 2 and the position of the two-dimensional code 29a on the display of the power receiver 2 is associated with the camera 16b of the power source 1, the processing involved can be done by only one operation.

The camera 29b of the power receiver 2 may even read the two-dimensional code 16a printed on the power source 1 and perform only setting of a reference position, while the power supply specifications and authentication of the power receiver 2 are processed by communication using the ultra-short-range communication circuit units 15b and 28b provided in the power source 1 and the power receiver 2, respectively. In this case, no camera (two-dimensional code reading unit) 16b may be provided in the power source 1.

In place of a two-dimensional code, push button switches having predetermined shapes may be provided in the power source 1 and the power receiver 2 and pressed in contact with each other to allow the power source 1 to recognize the power receiver 2 and set a reference position for the power receiver 2.

The antennas 15a and 28a and the communication circuit units 15b and 28b illustrated in FIG. 10 and the two-dimensional codes 16a and 29a and the two-dimensional code reading units 16b and 29b illustrated in FIG. 11 are merely examples, and can employ various configurations, as a matter of course.

In the embodiments illustrated in FIG. 10 and FIG. 11, the power transfer control unit 13 and the communication circuit unit 14 of the power source 1, the power reception control unit 23 and the communication circuit unit 24 of the power receiver 2, and the like are the same as in, for example, FIG. 3 described earlier, and a description thereof will not be given.

FIG. 12A to FIG. 12F are diagrams for illustrating the operations of the wireless power transfer system of the present embodiment, and mainly illustrates an example in which the ultra-short-range communication circuit unit 15b (antenna 15a) is placed at one end of the horizontal plate 32 of the table 3 (power source 1) depicted in FIG. 8 described earlier. Even the power receiver 2 is provided with the ultra-short-range communication circuit unit 28b (antenna 28a) for ultra-short-range communication with the power source 1.

In other words, referring to FIG. 12A to FIG. 12F, the power source 1 (table 3) includes a vertical plate 31 provided with a power source resonance coil 11aA and a horizontal plate 32 provided with a power source resonance coil 11aB.

The power source resonance coils (power source coils) 11aA and 11aB are provided orthogonally and form a certain area (three-dimensional power supply zone) for three-dimensional wireless power supply to the power receiver 2.

As the three-dimensional power supply zone, a region defined by a vertical surface of about 30 cm×30 cm extending in the longitudinal directions of the vertical plate 31 and the horizontal plate 32, for example, is used so that a portable terminal, for example, is used or mounted in the power supply zone to perform wireless power supply.

The power source 1 estimates (detects) the relative position and the posture of the power receiver 2 using a scheme to be described later, and controls the strengths and phases of magnetic fields output from the power source resonance coils 11aA and 11aB on the basis of positional and posture information of the power receiver 2 to generate a synthetic magnetic field which achieves an appropriate transfer efficiency.

The power source 1 and the power receiver 2 include communication circuit units 14 and 24, respectively, which perform energy exchange by wireless power supply and information communication for such exchange. Communication by the communication circuit units 14 and 24 can use, for example, Bluetooth (registered trademark), as described earlier. An acceleration sensor (first sensor) 26 and a geomagnetic sensor (second sensor) 27 are further built into or optionally attached to the power receiver 2.

Figure 12A:
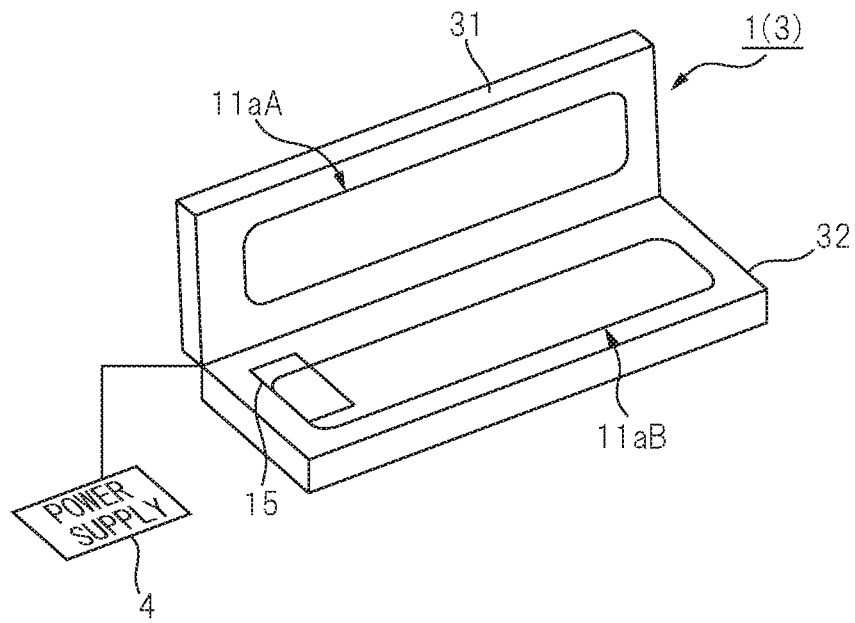
FIG. 12A, FIG. 12B, FIG. 12C, FIG. 12D, FIG. 12E, and FIG. 12F are diagrams for illustrating the operations of the wireless power transfer system of the present embodiment.

A power receiver detection unit 15 for detecting and authenticating a power receiver 2 is placed at one end of the horizontal plate 32 of the power source 1 (3), as depicted in FIG. 12A. The power receiver detection unit 15 may be placed anywhere as long as it allows easy access by the user and identification of the position of the power receiver 2 relative to itself (power source 1) in advance.

The power receiver detection unit 15 incorporates an ultra-short-range communication circuit unit 15b and an antenna 15a for detecting and authenticating a power receiver 2 and used to perform ultra-short-range communication with the reference position detection unit 28 (ultra-short-range communication circuit unit 28b and antenna 28a) of the power receiver 2.

An ultra-short-range communication function can be implemented by employing a technique for non-contact IC cards such as FeliCa (registered trademark) or MIFARE (registered trademark), as described earlier. The power receiver detection unit 15 can even serve as, for example, a power receiver detection unit 16 including a two-dimensional code 16a and a camera 16b, as described with reference to FIG. 11.

Figure 12B:
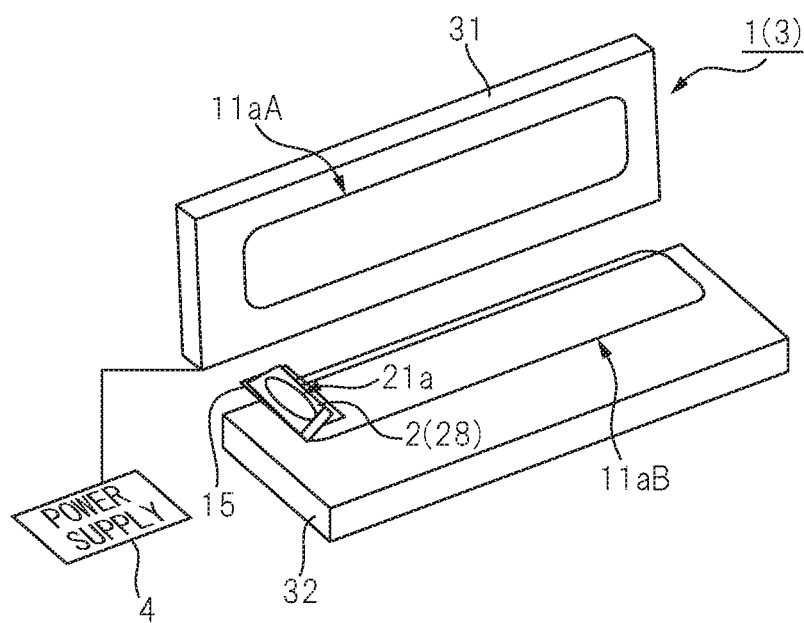

When the user starts power supply to the power receiver 2, the antenna 15a provided in the power receiver detection unit 15 of the power source 1 is brought into proximity to the antenna 28a in the reference position detection unit 28 of the power receiver 2, as depicted in FIG. 12B.

In other words, when the user starts power supply, for example, a mobile device (power receiver 2) to receive power is brought into contact with the power receiver detection unit 15 of the power source 1. In this case, when, for example, the user stops the power receiver 2 for a short time, ultra-short-range communication is performed between the power source 1 and the power receiver 2 to check the standards and the power supply specifications by mutual authentication.

Such ultra-short-range communication can employ a technique such as FeliCa (registered trademark), as described with reference to FIG. 10, but a two-dimensional code and a camera, as described with reference to FIG. 11, may be used in place of ultra-short-range communication.

The pieces of positional information of both the power source 1 and the power receiver 2 are reset to, for example, adjust the position of the power receiver detection unit 15 of the power source 1 to a reference position (origin) for movement distance calculation using the output of the acceleration sensor (26). Out-band communication, i.e., communication by the communication circuit units 14 and 24 is also established.

When, for example, push button switches are provided in the power source 1 and the power receiver 2 and pressed in contact with each other, only positional information reset processing, for example, is performed without mutual authentication.

Upon the completion of the above-mentioned preparation, user-recognizable information can be displayed (by, e.g., display on an LED or a liquid crystal display, or voice guidance) in a predetermined portion or the like in the power receiver detection unit 15 or the power source 1 and used as a sign that power supply may be started. Even for the power receiver 2, recognizable information may be displayed and used as a sign that power supply may be started.

Figure 12C:
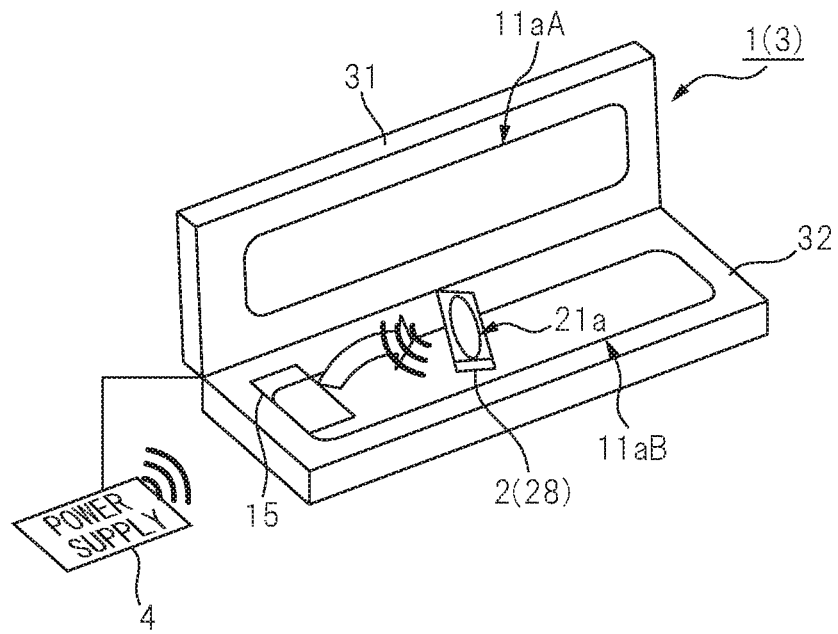

Further, for example, when the user confirms the display of the above-mentioned completion of preparation, the power receiver 2 can be moved to an arbitrary location in the power supply zone (wireless power supply zone) and used, as depicted in FIG. 12C.

For example, the user may sit in the chair 5 and mount the power receiver 2 on the horizontal plate 32 or perform operations in the power supply zone, as described with reference to FIG. 8. In this case, the power receiver 2 is recognized to be in motion using the acceleration sensor 26 and its movement distance from the position (reference position) where is at rest is calculated using the power receiver detection unit 15.

While, for example, the output of the acceleration sensor 26 keeps a certain value or more, the second-order integral of the acceleration sensor output is calculated to calculate a movement distance. The power reception control unit 23 in the power receiver 2, for example, is used to process the output of the acceleration sensor 26 to calculate the positional information of the power receiver 2.

The posture of the power receiver 2 can be calculated by, for example, using the acceleration sensor (gravity sensor) 26 and the geomagnetic sensor 27 in combination. The calculated movement distance and posture information are, for example, sent to the power source 1 by out-band communication (communication circuit units 24 and 14) with a certain time interval.

Figure 12D:
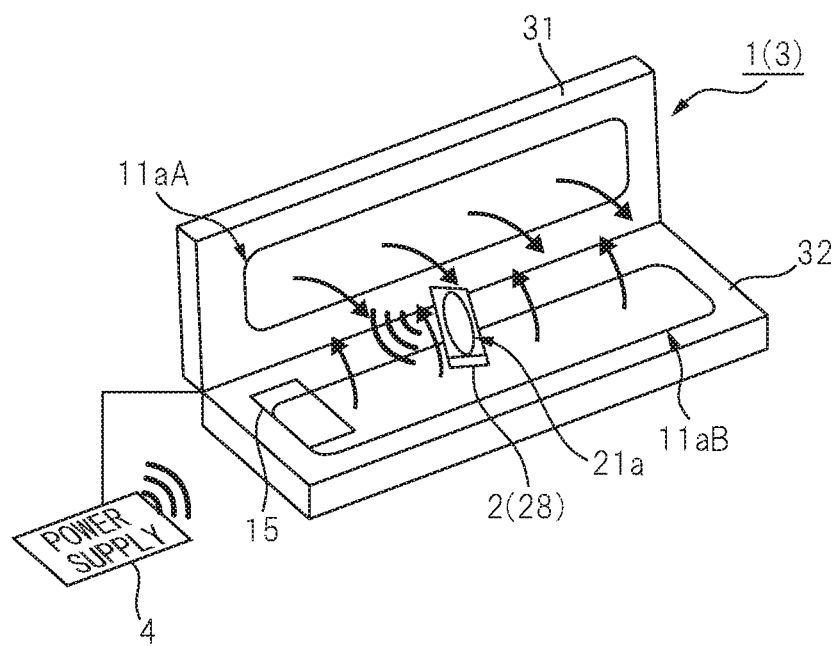

As depicted in FIG. 12D, for example, the output from the acceleration sensor 26 allows detection that the power receiver 2 has been stopped, and output setting corresponding to the positional information (first positional information: the movement distance from the power receiver detection unit 15) and the posture information at this time is performed.

In other words, the power source 1 controls the power source resonance coils 11aA and 11aB on the basis of not only the power supply specifications (charging information) obtained by mutual authentication, described with reference to FIG. 12B, but also the positional and posture information of the power receiver 2, to perform appropriate power supply to the power receiver 2.

In this manner, at the start of power supply (power transfer), magnetic fields generated by the power source resonance coils 11aA and 11aB are controlled to supply power, on the basis of power supply conditions based on the first positional information calculated from the output of the acceleration sensor 26.

The power supply specifications sent to the power source 1 by mutual authentication include various power supply specifications such as the battery capacity and remaining level of the power receiver 2 and the specifications (e.g., the Q value) and load information of the power receiver resonance coil 21a.

The power source 1 calculates appropriate output set values for the power source resonance coils 11aA and 11aB by, for example, calculation or lookup table using the power transfer control unit 13. Upon the completion of output setting, power supply (power transfer) from the power source 1 (table 3) to the power receiver 2 is started. Test power transfer from the power source 1 to the power receiver 2 may be conducted where appropriate, as a matter of course.

Figure 12E:
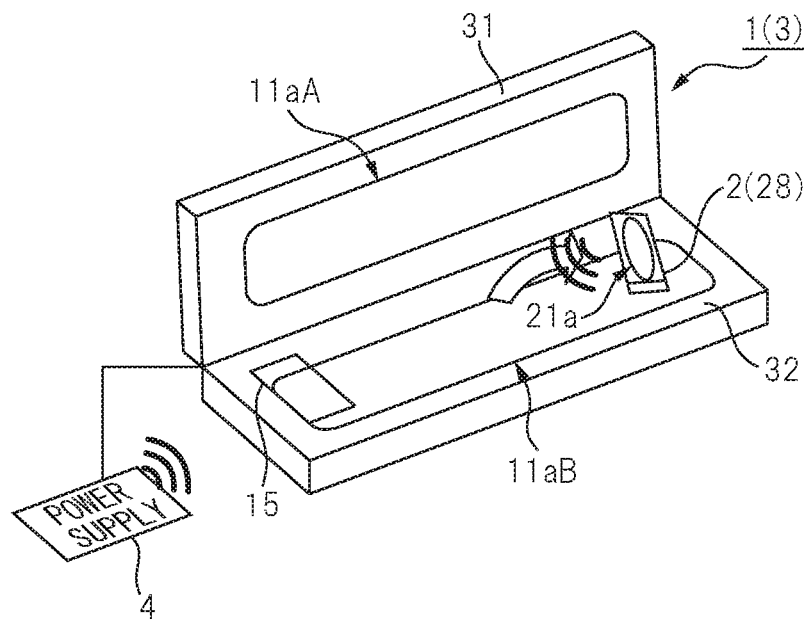

The above-mentioned movement distance calculation of the power receiver 2 based on the output of the acceleration sensor 26 is stopped, as depicted in FIG. 12E. The movement distance of the power receiver 2 is calculated by, for example, second-order integral calculation of the output of the acceleration sensor 26 with reference to the position of the power receiver detection unit 15, prolongation of which may lead to accumulation of calculation errors.

For this reason, the movement distance (positional information) of the power receiver 2 obtained by calculating the second-order integral of the output of the acceleration sensor 26 is used only as initial setting, and the position of the power receiver 2 is estimated on the basis of power supply information during power supply. However, since the posture of the power receiver 2 is calculated by obtaining the outputs of the acceleration sensor 26 and the geomagnetic sensor 27 in homogeneous dimensions (without integral calculation), no problem such as accumulation of calculation errors is posed.

In other words, while power is supplied from the power source 1 to the power receiver 2, an efficiency ($\eta$) can be calculated. The efficiency $\eta$ can be calculated as, for example, $\eta = P_2/P_1$ where $P_1$ is the transferred power of the power source 1 and $P_2$ is the received power of the power receiver 2, and the efficiency (measured efficiency) $\eta$ can be determined by measuring $P_1$ and $P_2$.

A coefficient of coupling (k) can be calculated from the positional information (second positional information) of the power receiver 2 obtained from the efficiency $\eta$ and the posture information of the power receiver 2 obtained from the outputs of the acceleration sensor 26 and the geomagnetic sensor 27. In other words, after the start of power transfer from the power source 1 to the power receiver 2, magnetic fields generated by the power source resonance coils 11aA and 11aB are controlled to supply power, on the basis of power supply conditions based on the second positional information calculated from the efficiency $\eta$.

The kQ value (kQ) is the product of the k value (coefficient of coupling: k, k') indicating the degree of coupling of electromagnetic fields (magnetic or electric fields) and the Q value (loss: Q) indicating the degree of loss of the electromagnetic fields. The larger the k value, the higher the degree of coupling; and the larger the Q value, the lower the degree of loss.

A kQ value can be calculated from the efficiency (measured efficiency) $\eta$ defined from the power source 1 to the power receiver 2, and a coefficient of coupling k can be calculated because the coil loss Q is known. The relationship between $\eta$ and the kQ value, and the like will be described in detail later with reference to FIG. 13A to FIG. 13C.

The position of the power receiver 2 can be estimated from the coefficient of coupling k (estimated coefficient of coupling k') and the posture information of the power receiver 2 obtained from the outputs of the acceleration sensor 26 and the geomagnetic sensor 27. Position information is estimated (calculated) by, for example, the power transfer control unit 13 in the power source 1.

The thus obtained, estimated positional information of the power receiver 2 is expected to be more reliable than the positional information obtained by calculating the second-order integral of the output of the acceleration sensor 26 of the power receiver 2 from the position of the power receiver detection unit 15 of the power source 1, mentioned earlier.

According to the present embodiment, in the initial state, power supply from the power source 1 to the power receiver 2 can be immediately started without test power transfer or the like, using positional information based on the output of the acceleration sensor 26 of the power receiver 2.

Then, during actual power supply from the power source 1 to the power receiver 2, for example, an efficiency $\eta$ can be calculated by communication using the communication circuit units 14 and 24 and the positional information of the power receiver 2 can be estimated from the kQ value. The efficiency η can be calculated as, for example, $\eta=P_2/P_1$ where $P_1$ is the transferred power of the power source 1 and $P_2$ is the received power of the power receiver 2. In other words, the efficiency (measured efficiency) η can be determined by measuring $P_1$ and $P_2$.

According to the present embodiment, the positional information of the power receiver 2 is calculated using not the positional information based on the output of the acceleration sensor 26 of the power receiver 2 but the measured efficiency during power supply, and then power is supplied, thus allowing appropriate power supply.

Figure 12F:
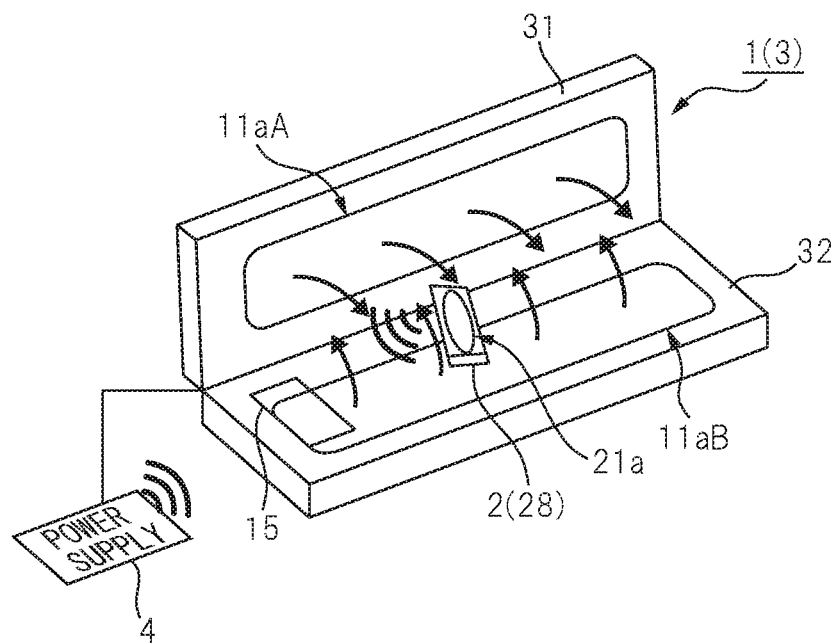

As depicted in FIG. 12F, when the output of the acceleration sensor 26 exceeds a certain value during power supply, it is determined that, for example, the power receiver 2 moves by user operation, the second-order integral of the output of the acceleration sensor 26 is calculated, and movement distance calculation is restarted.

As for the posture, the posture information of the power receiver 2 obtained from the outputs of the acceleration sensor 26 and the geomagnetic sensor 27, for example, is communicated to the power source 1 via the communication circuit units 24 and 14, together with the positional information. In this case, when, for example, the movement speed is too high to stabilize power supply, power supply may be suspended. When the output of the acceleration sensor 26 falls below the certain value, the process returns to the process described with reference to FIG. 12D again, in which power supply can be reset.

In the foregoing description, the following two cases where power supply from the power source 1 (table 3) to the power receiver 2 is stopped, for example, are conceivable. In the first case, power supply may not be involved as, for example, the secondary battery (battery) of the power receiver 2 is fully charged.

In this case, the power source 1 is notified that the power receiver 2 has been fully charged via the communication circuit units 24 and 14, and power transfer is stopped. A series of power receiver control operations in the power receiver 2 is also stopped.

In the second case, the user stops power supply on his or her own will. In this case, the user issues a power supply OFF instruction via an interface of the power receiver 2 to notify the power source 1 to that effect by wireless communication. Alternatively, a power supply OFF instruction is issued from the power receiver 2 (user) by ultra-short-range communication by bringing the power receiver 2 into proximity to or contact with the power receiver detection unit 15, as in the start of power supply.

As an exception, for example, the user may move the power receiver 2 outside the power supply zone during use, thus making power supply control difficult. In this case, the user is quickly notified to that effect via an interface (e.g., a display screen, a sound, or vibration) of the power receiver 2, and a power transfer OFF instruction is issued to the power source 1 via the communication circuit units 24 and 14.

In this manner, with the wireless power transfer system of the present embodiment, the power source 1 (table 3) is equipped with a power receiver detection unit 15 (16) for detecting the initial position of the power receiver 2. The power receiver detection unit can employ, for example, ultra-short-range communication or a two-dimensional code, and bringing the power receiver 2 into proximity to or contact with the power receiver detection unit allows, for example, setting of a reference position for the power receiver 2, and a sign (declaration of intention) to start power supply to the power receiver 2.

Further, for example, various types of information such as specification information including the capacity and amount of charge of the battery of the power receiver 2 or information used in billing upon a user power receiver contract or power supply can be sent to the power source 1 by ultra-short-range communication upon contact between the power receiver detection unit 15 and the power receiver 2.

The power receiver 2 calculates positional information with reference to the position of the power receiver detection unit 15, for example, using the acceleration sensor 26, and sends the posture information of the power receiver 2 obtained using the acceleration sensor 26 and the geomagnetic sensor 27 in combination to the power source 1 using out-band communication.

The power source 1 uses the specification information of the power receiver 2 obtained by ultra-short-range communication and the positional information and the posture information of the power receiver 2 obtained by out-band communication as the initial power supply information to start power supply. In other words, power supply to the power receiver 2 can be immediately started without, for example, test power transfer from the power source 1 to the power receiver 2.

While power is supplied from the power source 1 to the power receiver 2, the power source 1 can recognize (measure) the efficiency (η) using out-band communication and therefore estimates the positional information of the power receiver 2 using, for example, the measured efficiency η and the kQ value.

In other words, since integral errors may accumulate in the positional information based on the acceleration sensor 26 of the power receiver 2 and lower the accuracy, positional information obtained using a method expected to attain a higher accuracy is used in the power supplied state.

In a wireless power transfer system which employs the magnetic field resonance (electric field resonance) scheme, the output setting accuracy of a power source can be improved, thus achieving stable power supply control. Further, making a power receiver detection unit provided in the power source authenticate (contact) the power receiver allows declaration of the user's intention to start power supply.

Figure 13A:
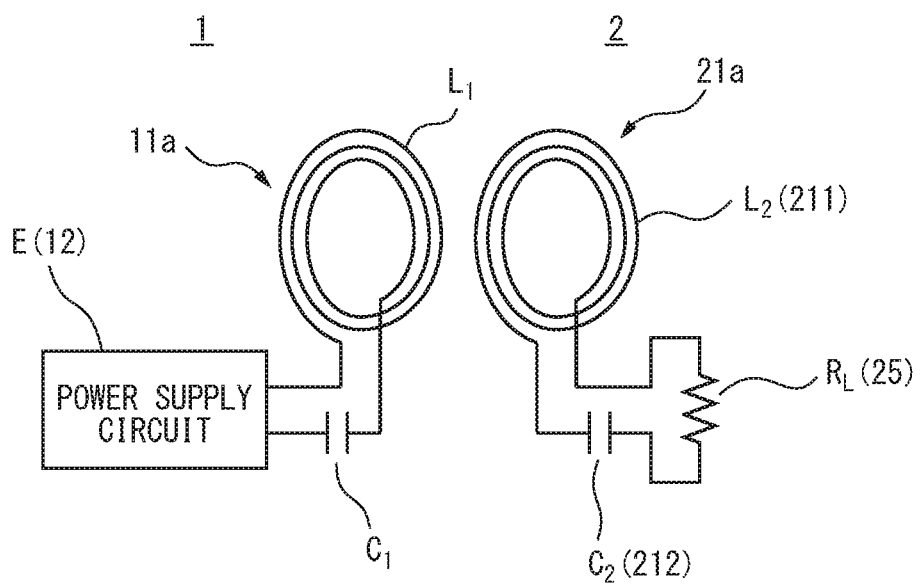
FIG. 13A, FIG. 13B, and FIG. 13C are diagrams for illustrating the relationships between the kQ value, and the efficiency η and the coefficient of coupling k.
Figure 13B:
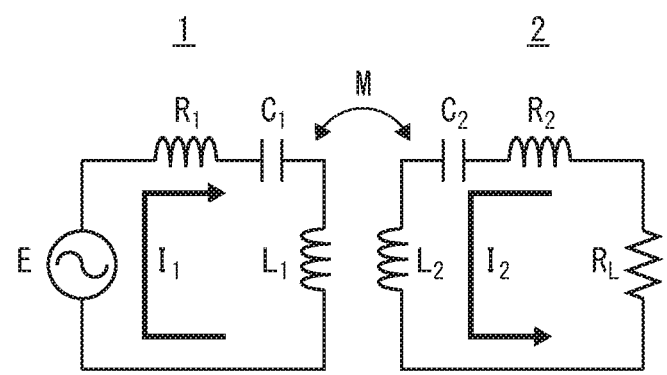
Figure 13C:
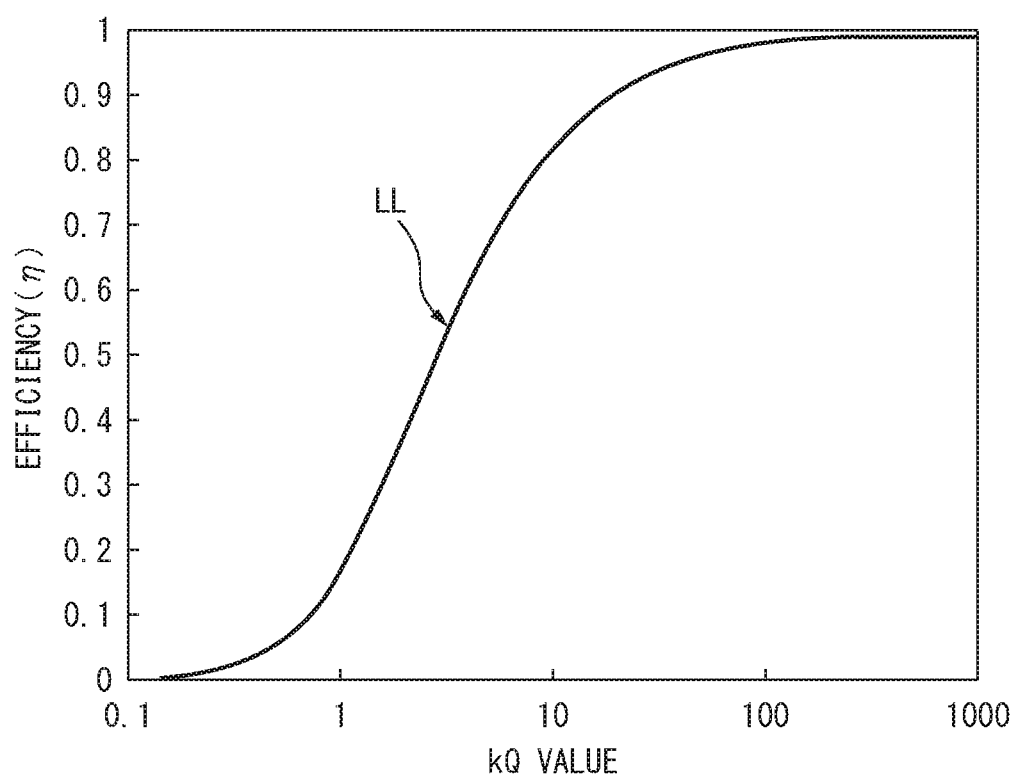

FIG. 13A to FIG. 13C are diagrams for illustrating the relationships between the kQ value, and the measured efficiency η and the coefficient of coupling k. FIG. 13A is a diagram conceptually depicting the power source 1 (power source resonance coil 11a) and the power receiver 2 (power receiver resonance coil 21a), and corresponds to, for example, an example of the power source coil depicted in FIG. 4C mentioned earlier.

FIG. 13B is a diagram depicting an equalizer circuit of the power source 1 and the power receiver 2 depicted in FIG. 13A, and FIG. 13C is a diagram illustrating the relationship between the efficiency (η) and the kQ value based on $R_L/R_2$. The power source coil (wireless power transfer unit and wireless power reception unit) is not limited to that depicted in FIG. 4C, and it may have a configuration depicted in, for example, FIG. 3, FIG. 4A, and FIG. 4B, as a matter of course.

Power transfer using a magnetic field (electric field) generated between one power source 1 (power source resonance coil 11a) and one power receiver 2 (power receiver resonance coil 21a) can be conceived as depicted in FIG. 13A and is represented by an equalizer circuit as depicted in FIG. 13B.

Referring to FIG. 13B, reference signs $R_1$ and $L_1$ denote the loss (resistance value) and the self-inductance of the power source resonance coil 11a (coil); and $R_2$ and $L_2$, the resistance value and the self-inductance of the power receiver resonance coil 21a (coil 211). Reference sign $R_L$ denotes the load resistance of an object to be supplied with power (battery unit 25); and M, the mutual inductance between the power source resonance coil 11a and the power receiver resonance coil 21a.

Reference sign $C_1$ denotes the capacitance of the power source resonance coil 11a (capacitor); $C_2$, the capacitance of the power receiver resonance coil 21a (capacitor 212); $I_1$ and $I_2$, currents flowing through the power source resonance coil 11a and the power receiver resonance coil 21a; and E, a power supply circuit (12).

The kQ value, the k value, and the Q values ($Q_1$, $Q_2$) of the power source and the power receiver are given by:

[Mathematical 1]

$$kQ = k\sqrt{Q_1 \cdot Q_2} \quad (1)$$

$$k = \sqrt{\frac{M_{12}}{L_1 \cdot L_2}} \quad (2)$$

$$Q_1 = \frac{\omega L_1}{R_1}, \quad Q_2 = \frac{\omega L_2}{R_2} \quad (3)$$

The efficiency of the power receiver resonance coil 21a (power receiver 2) varies depending not only on the resistance value $R_2$ of the coil 211 but also on the load resistance $R_L$ of an object to be supplied with power. For example, in the power receiver 2, the resistance value $R_2$ of the coil 211 in the power receiver resonance coil 21a is designed to minimize, while the load resistance $R_L$ varies depending, for example, on the charging rate of a secondary battery.

In the above-mentioned present embodiment, the value of the load resistance $R_L$, for example, is sent from the power receiver 2 to the power source 1 by, for example, mutual authentication using ultra-short-range communication between the power source 1 and the power receiver 2. Referring to FIG. 13C, the efficiency η is given by:

[Mathematical 2]

$$\eta = \frac{1}{\left\{\frac{1}{kQ^2}\left(\frac{R_L}{R_2}+1\right)+1\right\}\left(1+\frac{R_2}{R_L}\right)} \quad (4)$$

The relationship between the kQ value and the efficiency (η) varies depending on the load resistance $R_L$, which can be handled by various methods (not illustrated), and only the relationships between the kQ value, and the measured efficiency η and the coefficient of coupling k will be described herein. Referring to FIG. 13C, a curve LL represents the characteristics when the ratio between the resistance value $R_2$ of the coil 211 and the load resistance $R_L$ is always optimum (ideal efficiency or maximum efficiency).

As for the Q value indicating the degree of energy loss, ω and $L_1$ in the power source resonance coil 11a and ω and $L_2$ in the power receiver resonance coil 21a, for example, can be normally regarded as constant.

A kQ value can be calculated (estimated) by, for example, applying the measured efficiency η and further applying the resistance ratio $R_L/R_2$ and its reciprocal $R_2/R_L$ to equation (4). As long as a kQ value can be calculated, a k value can also be calculated. A coefficient of coupling (k) can be calculated from the positional information (estimated positional information) of the power receiver 2, and the posture information of the power receiver 2 obtained from the outputs of the acceleration sensor 26 and the geomagnetic sensor 27.

In this manner, according to the present embodiment, in the initial state, when the second-order integral of the output of the acceleration sensor 26 is calculated to obtain positional information from the power receiver detection unit 15, and power is actually supplied from the power source 1 to the power receiver 2, an efficiency η is measured and the positional information of the power receiver 2 is estimated. Processing for changing the positional information will be described below with reference to FIG. 14.

Figure 14:
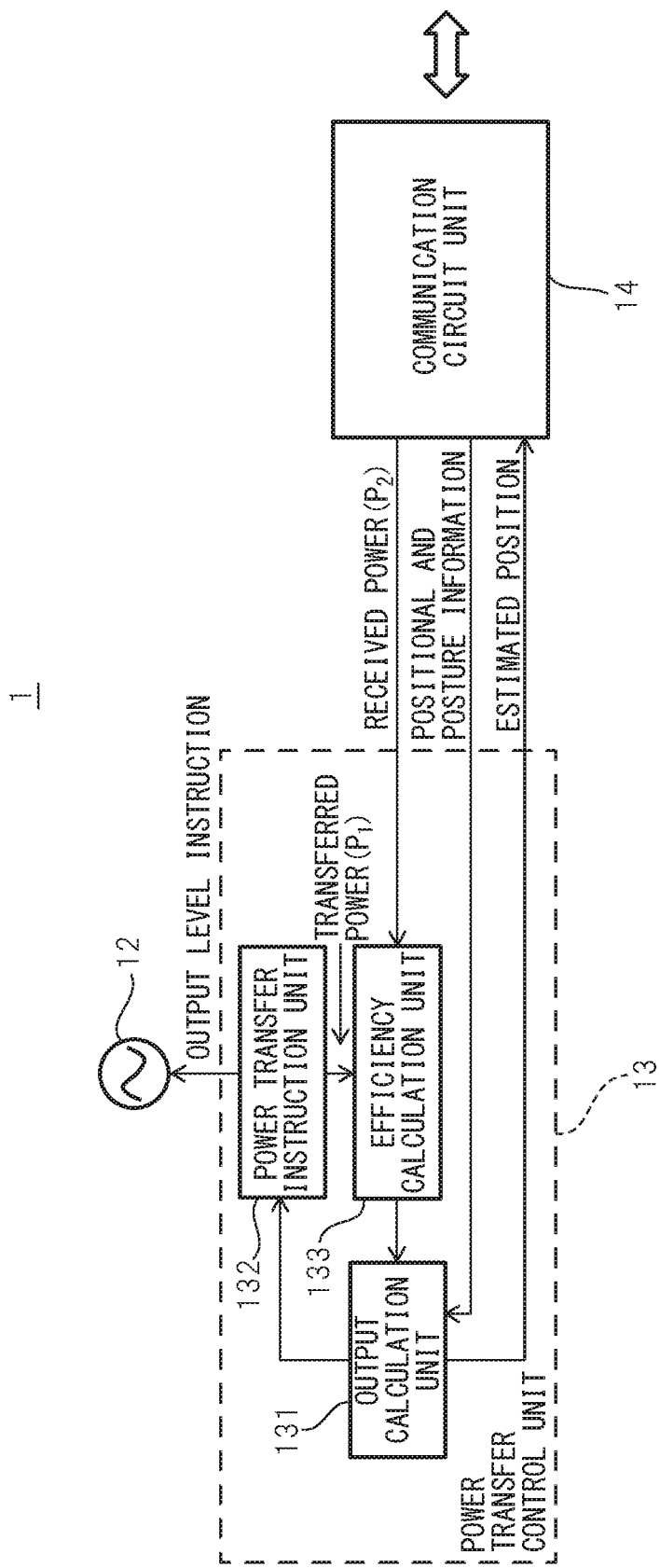
FIG. 14 is a diagram for illustrating processing for changing the positional information in the wireless power transfer system of the present embodiment.

FIG. 14 is a diagram for illustrating processing for changing the positional information in the wireless power transfer system of the present embodiment, and depicts the high frequency power supply unit 12, the power transfer control unit 13, and the communication circuit unit 14 in the power source 1.

The power transfer control unit 13 includes an output calculation unit 131, a power transfer instruction unit 132, and an efficiency calculation unit 133, as depicted in FIG. 14. In the power transfer control unit 13, a transferred power $P_1$ (transferred power output level) is determined in the following way.

The case where the positional information of the power receiver 2 is obtained by the acceleration sensor 26 before the start of power supply from the power source 1 during movement of the power receiver 2, i.e., the case described with reference to FIG. 12C will be considered first.

In this case, the positional information and the posture information of the power receiver 2 based on the outputs of the acceleration sensor (acceleration pickup) 26 and the geomagnetic sensor 27 are sent to the communication circuit unit 14 of the power source 1 via the power reception control unit 23 and the communication circuit unit 24 in the power receiver 2.

The power transfer control unit 13 receives these types of information and, for example, uses the output calculation unit 131 to calculate a coefficient of coupling (k) between the power source 1 and the power receiver 2, further calculates a kQ value from the Q values of the coils collected in authentication in advance, and estimates a power transfer efficiency (η') described as a function of the kQ value.

Then, for example, the estimated power transfer efficiency η' and the transferred power ($P_1=P/\eta'$) calculated from the power requirement (P) of the power receiver 2 are sent as instructions to the high frequency power supply unit 12 (power supply amplifier) via the power transfer instruction unit 132. The power transfer control unit 13 also collects the power requirement P of the power receiver 2 in authentication in advance.

The case where positional information is absent (no positional information obtained by the acceleration sensor 26 is used) during power supply to the power receiver 2, i.e., the case described with reference to FIG. 12E will be considered next. In this case, a received power ($P_2$), and the positional information and the posture information of the power receiver 2 based on the outputs of the acceleration sensor 26 and the geomagnetic sensor 27 of the power receiver 2 are sent to the communication circuit unit 14 of the power source 1 via the power reception control unit 23 and the communication circuit unit 24 in the power receiver 2.

The power transfer control unit 13 receives these types of information and, for example, uses the efficiency calculation unit 133 to calculate an efficiency (measured efficiency η) from the transferred power $P_1$ obtained from the power transfer instruction unit 132 and the received power $P_2$ sent from the power receiver 2 and outputs the measured efficiency η to the output calculation unit 131.

The output calculation unit 131 calculates a kQ value from the measured efficiency η and further estimates a coefficient of coupling (k') from the Q values of the coils collected in authentication in advance. The output calculation unit 131 estimates the position of the power receiver 2 on the basis of the estimated coefficient of coupling k' and the posture information obtained by the acceleration sensor 26 and the geomagnetic sensor 27 of the power receiver 2 and communicates the estimated position to the power receiver 2 via the communication circuit unit 14 while occasionally updating it.

The output calculation unit 131 includes a table or an arithmetic function for calculating the position of the power receiver 2 from the estimated coefficient of coupling k' and the posture information. Then, for example, the measured efficiency η and the transferred power ($P_1=P_2/η$) calculated from the received power ($P_2$) obtained by the power receiver 2 are sent as instructions to the high frequency power supply unit 12 via the power transfer instruction unit 132.

In this manner, in the present embodiment, positional information obtained from the output of the acceleration sensor 26 of the power receiver 2 is used at the start of power supply, but when power supply is started, power supply efficiency information can be obtained and, therefore, power is supplied using positional information obtained from the power supply efficiency information.

As described above, according to the present embodiment, in the initial state in which power supply from the power source 1 to the power receiver 2 is started, for example, power supply can be immediately started using positional information obtained from the output of the acceleration sensor 26 upon setting of the power receiver detection unit 15 as an origin. During power supply, estimating positional information from the power supply efficiency η and the posture information of the power receiver 2 allows appropriate power supply while avoiding accumulation of errors upon integral calculation of the output of the acceleration sensor 26.

Figure 15A:
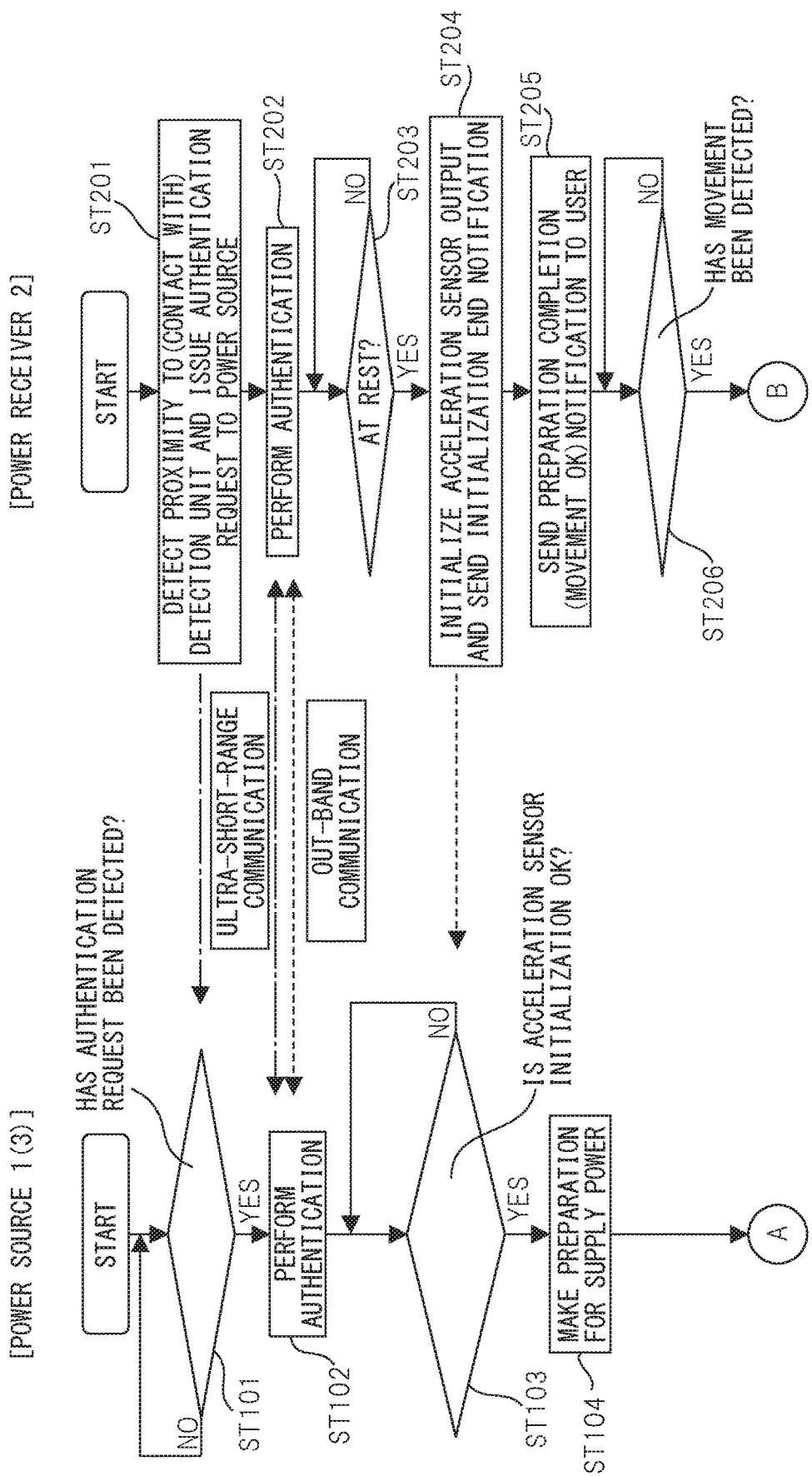
Figure 15C:
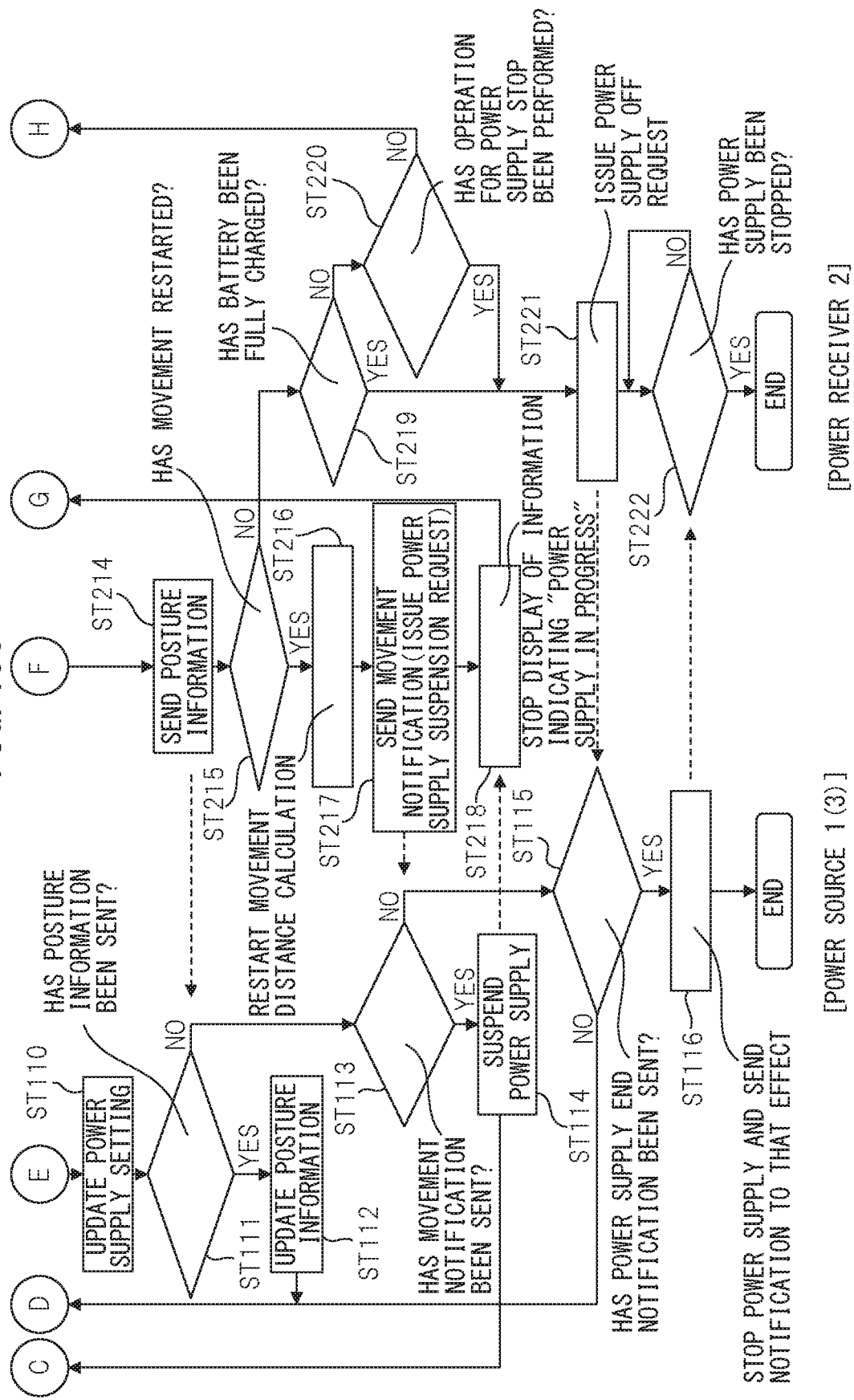

FIG. 15A to FIG. 15C are flowcharts each depicting one example of wireless power transfer processing in the wireless power transfer system of the present embodiment. Referring to FIG. 15A to FIG. 15C, steps ST101 to ST116 represent the processes in the power source 1 (table 3) and steps ST201 to ST222 represent the processes in the power receiver 2.

As depicted in FIG. 15A to FIG. 15C, when wireless power transfer processing is started, it is determined in step ST101 of the power source 1 (table 3) whether an authentication request has been detected, and detection determination of an authentication request continues until an authentication request from the power receiver 2 is detected.

When the power receiver 2 detects proximity to or contact with the power receiver detection unit 15 (antenna 15a) of the power source 1 and issues an authentication request to the power source 1 in step ST201 of the power receiver 2, it is determined in step ST101 of the power source 1 that an authentication request has been detected, and the process advances to step ST102.

In step ST202 of the power receiver 2 and step ST102 of the power source 1, mutual authentication processing is performed. Mutual authentication between the power source 1 and the power receiver 2 is performed by, for example, ultra-short-range communication using the antennas 15a and 28a and the ultra-short-range communication circuit units 15b and 28b.

Mutual authentication between the power source 1 and the power receiver 2 may be performed using, for example, the two-dimensional codes 16a and 29a and the cameras 16b and 29b, as described earlier. The details of mutual authentication may include various details such as power supply specifications such as the capacity and remaining level of a battery provided in the power receiver 2, the necessity of power supply, and information (the permission and charge of power supply) used in billing upon a user power receiver contract or power supply.

In the power receiver 2, the process advances to step ST203, in which it is determined whether the power receiver 2 is at rest, and the process continues until it is determined that the power receiver 2 is at rest, and when it is determined that the power receiver 2 is at rest, the process advances to step ST204, in which the output of the acceleration sensor 26 is initialized and an initialization end notification is sent to the power source 1. An initialization end notification is sent from the power receiver 2 to the power source 1 by, for example, out-band communication using the communication circuits 14 and 24.

In this case, in the power source 1, in step ST103, determination processing as to whether the acceleration sensor 26 has been initialized continues, and in response to the initialization end notification from the power receiver 2, the process advances to step ST104, in which preparation is made to supply power. The process advances to step ST105, in which it is determined whether a power supply request has been issued from the power receiver 2.

In the power receiver 2, a preparation completion (movement OK) notification is sent to the user in step ST205, and the process advances to step ST206, in which it is determined whether movement of the power receiver 2 has been detected, and the process continues until movement is detected.

When it is determined in step ST206 that movement of the power receiver 2 has been detected, the process advances to step ST207, in which movement distance calculation of the power receiver 2 is started. In other words, the second-order integral of the output of the acceleration sensor 26 is calculated to calculate the distance from the power receiver detection unit (15). The process advances to step ST208, in which it is determined whether the power receiver 2 has stopped its movement, and the process continues until it is determined that the power receiver 2 has stopped its movement.

When it is determined in step ST208 that the power receiver 2 has stopped its movement, the process advances to step ST209, in which movement distance calculation is stopped, and the process further advances to step ST210, in which a power supply request and positional information and posture information are sent to the power source 1. Such a power supply request and positional information and posture information are sent from the power receiver 2 to the power source 1 by out-band communication (communication circuit units 24 and 14).

It is determined in step ST105 of the power source 1 that a power supply request has been issued from the power receiver 2 upon sending of a power supply request and positional information and posture information in step ST210 of the power receiver 2, and the process advances to step ST106. In step ST106, the positional information and the posture information of the power receiver 2 are updated, and the process further advances to step ST107, in which power supply setting is performed and power supply is started.

It is determined in step ST211 of the power receiver 2 whether power supply from the power source 1 has been detected, and when it is determined that power supply has been detected in response to the start of power supply in step ST107 of the power source 1, the process advances to step ST212, in which information indicating "power supply in progress" is displayed on the power receiver 2. When it is determined in step ST211 that power supply from the power source 1 has not been detected, the process returns to step ST210, in which a power supply request and positional information and posture information are sent to the power source 1.

In the power receiver 2, after information indicating "power supply in progress" is displayed in step ST212, the process advances to step ST213, in which a received power ($P_2$) is measured and sent to the power source 1, and the process further advances to step ST214, in which posture information is sent to the power source 1. A received power $P_2$ and posture information are sent from the power receiver 2 to the power source 1 by out-band communication.

It is determined in step ST108 of the power source 1 whether a received power $P_2$ has been sent from the power receiver 2, and when it is determined that a received power $P_2$ has been sent, the process advances to step ST109, in which a power supply efficiency is calculated, the position of the power receiver 2 is estimated, and the process further advances to step ST110.

Calculation of a power supply efficiency ($\eta$) in step ST109 uses, for example, the transferred power $P_1$ of the power source 1 described with reference to FIG. 14. When it is determined in step ST108 that the received power $P_2$ has not been sent from the power receiver 2, the same process continues until it is determined that such information has been sent.

In step ST110 of the power source 1, the power supply setting is updated and the process advances to step ST111, in which it is determined whether posture information has been sent from the power receiver 2. When it is determined in step ST111 that posture information has been sent in response to the posture information sent in step ST214 of the power receiver 2, the process advances to step ST112, in which the posture information is updated, and the process returns to step ST108, in which the same process is repeated.

When it is determined in step ST111 of the power source 1 that no posture information has been sent, the process advances to step ST113, in which it is determined whether a movement notification has been sent from the power receiver 2, and when it is determined that a movement notification has been sent, the process advances to step ST115.

When it is determined in step ST113 that a movement notification has been sent from the power receiver 2, i.e., the output of the acceleration sensor 26 of the power receiver 2 exceeds a certain value during power supply, it is determined that, for example, the power receiver 2 moves by user operation, and the process advances to step ST114.

Power supply is suspended in step ST114, and the process returns to step ST105, in which it is determined whether a power supply request has been issued from the power receiver 2. Further, in step ST114, the power receiver 2 is notified that power supply has been suspended. A power supply suspension notification is sent to the power receiver 2 by out-band communication as well.

It is determined in step ST215 of the power receiver 2 whether the power receiver 2 has restarted its movement, and when it is determined that the power receiver 2 has restarted its movement, the process advances to step ST216, in which movement distance calculation based on the output of the acceleration sensor 26 is restarted.

The process advances to step ST217, in which the power source 1 is notified of movement of the power receiver 2 and requested to suspend power supply. In step ST218, display of the information indicating "power supply in progress" in step ST212 is stopped in response to the power supply suspension notification sent in step ST114 of the power source 1, and the process returns to step ST208, in which it is determined whether the power receiver 2 has stopped its movement.

When it is determined in step ST215 of the power receiver 2 that the power receiver 2 has not restarted its movement, the process advances to step ST219, in which it is determined whether the battery has been fully charged, and when it is determined that the battery has not been fully charged, the process advances to step ST220. It is determined in step ST220 whether an operation for power supply stop has been performed, and when it is determined that no operation for power supply stop has been performed, the process returns to step ST213, in which a received power $P_2$ is measured and sent to the power source 1.

When it is determined in step ST219 that the battery has been fully charged, and it is determined in step ST220 that an operation for power supply stop has been performed, the process advances to step ST221, in which a power supply OFF request is issued to the power source 1. The process advances to step ST222, in which it is determined whether power supply has been stopped.

It is determined in step ST115 of the power source 1 whether a power supply end notification has been sent, and when it is determined that a power supply end notification has been sent, the process returns to step ST108, in which the process waits for a received power $P_2$ from the power receiver 2.

It is determined in step ST115 that a power supply end notification has been sent in response to the power supply OFF request issued in step ST221 of the power receiver 2, and the process advances to step ST116, in which power supply is stopped and the power receiver 2 is notified of power supply OFF. The power supply processing (wireless power transfer processing) is ended.

It is determined in step ST222 of the power receiver 2 that power supply has been stopped in response to the power supply OFF notification from the power source 1, and the wireless power transfer processing is ended. A power supply OFF notification is sent from the power source 1 to the power receiver 2 by out-band communication as well.

In this manner, according to the present embodiment, the delay until the start of power transfer from the power source to the power receiver can be reduced by acquiring the initial values of the posture and the position of the power receiver relative to the power source. During power transfer from the power source to the power receiver, the use of positional information based on the measured power supply efficiency (measured efficiency) in place of positional information obtained by the acceleration sensor of the power receiver allows stable control with improved power transfer accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power source comprising:
    a power source coil configured to wirelessly transfer power to a power receiver using one of magnetic field resonance and electric field resonance;
    a power transfer control unit configured to control the power source coil; and
    a power receiver detection unit configured to detect the power receiver which is brought into proximity thereto or contact therewith, wherein
    the power transfer control unit is configured to
        control the power source coil based on first positional information of the power receiver calculated from a reference position where the power receiver is brought into proximity to or contact with the power receiver detection unit, at start of power transfer from a power source to the power receiver, and
        control the power source coil based on second positional information of the power receiver calculated from a transfer efficiency of the power, after the start of power transfer from the power source to the power receiver.

2. The power source according to claim 1, wherein the power receiver detection unit is provided near a power supply zone used by the power source coil.

3. The power source according to claim 1, wherein the power receiver detection unit is configured to authenticate the power receiver when the power receiver is brought into proximity thereto or contact therewith.

4. The power source according to claim 1, wherein the power receiver detection unit includes
    a first antenna, and
    a first ultra-short-range communication circuit unit configured to connect to the first antenna.

5. The power source according to claim 1, the power source further comprising:
    a first communication circuit unit configured to perform out-band communication, using a frequency different from that of transferring power from the power source to the power receive, with the power receiver, wherein
        the first positional information and the second positional information are sent from the power receiver via the first communication circuit unit.

6. The power source according to claim 1, wherein the power source coil includes at least two power source coils, which form a three-dimensional power supply zone in which the power is transferred to the power receiver.

7. The power source according to claim 1, wherein the power source includes:
    a standing plate provided with a first power source coil; and
    a horizontal plate provided with a second power source coil, and wherein
    the first power source coil and the second power source coil are formed as a table in a vertical L-shape.

8. A wireless power transfer system which wirelessly transfers power from a power source to a power receiver using one of magnetic field resonance and electric field resonance, wherein
    the power source comprising:
        a power receiver detection unit, which is provided near a power supply zone used by at least two power source coils, and configured to detect the power receiver which is brought into proximity thereto or contact therewith;
        a power transfer control unit configured to control the power source coil; and
        a first communication circuit unit configured to perform out-band communication, using a frequency different from that of transferring power from the power source to the power receive, with the power receiver, and
    the power receiver comprising:
        a reference position detection unit configured to detect a position where the power receiver is in proximity to or contact with the power receiver detection unit as a reference position;
        a first sensor configured to calculate a distance across which the power receiver moves from the reference position;
        a power reception control unit configured to calculate first positional information from the reference position, based on output of the first sensor; and
        a second communication circuit unit configured to perform out-band communication with the power source, wherein
    the power transfer control unit is configured to
        control the power source coil based on the first positional information, at start of power transfer from the power source to the power receiver, and
        control the power source coil based on second positional information of the power receiver calculated from an efficiency obtained via the first communication circuit unit and the second communication circuit unit, after the start of power transfer from the power source to the power receiver.

9. The power source according to claim 1, wherein the power receiver detection unit includes
    a first code, and
    a first code reading unit configured to read the first code.

10. The wireless power transfer system according to claim 8, wherein the first sensor includes an acceleration sensor.

11. The wireless power transfer system according to claim 8, wherein
    the power receiver comprises a second sensor configured to detect a posture of the power receiver, together with the first sensor, and
    the power source is configured to receive the first positional information and posture information obtained by the first sensor and the second sensor, via the first communication circuit unit and the second communication circuit unit.

12. The wireless power transfer system according to claim 11, wherein the second sensor includes a geomagnetic sensor.

13. The wireless power transfer system according to claim 8, wherein the power source and the power receiver are configured to authenticate each other via the power receiver detection unit and the reference position detection unit.

14. The wireless power transfer system according to claim 13, wherein when preparation to supply power is completed upon the mutual authentication, a sign is sent by display or voice to the power receiver or a predetermined portion in the power receiver detection unit or the power source.

15. The wireless power transfer system according to claim 13, wherein the power source and the power receiver comprise at least one of pieces of information concerning a power supply specification of the power receiver, necessity and permission of power supply to the power receiver, and billing upon power supply to the power receiver, via the power receiver detection unit and the reference position detection unit.

16. The wireless power transfer system according to claim 13, wherein
the power receiver detection unit includes a first antenna and a first ultra-short-range communication circuit unit, and
the reference position detection unit includes a second antenna and a second ultra-short-range communication circuit unit.

17. The wireless power transfer system according to claim 13, wherein
the power receiver detection unit includes a first code and a first code reading unit configured to read the first code, and
the reference position detection unit includes a second code and a second code reading unit.

18. The wireless power transfer system according claim 8, wherein power transfer from the power source to the power receiver is stopped by bringing the power receiver into proximity to or contact with the power receiver detection unit again.

* * * * *